US008599537B2

(12) United States Patent
Prax et al.

(10) Patent No.: US 8,599,537 B2
(45) Date of Patent: *Dec. 3, 2013

(54) MOBILE POWER SYSTEM

(75) Inventors: Eldon Prax, Dallas, TX (US); Stan Waldrop, Dallas, TX (US)

(73) Assignee: Sundial Power Pods, LLC, Dallas, TX (US)

( * ) Notice: Subject to any disclaimer, the term of this patent is extended or adjusted under 35 U.S.C. 154(b) by 560 days.

This patent is subject to a terminal disclaimer.

(21) Appl. No.: 12/878,761

(22) Filed: Sep. 9, 2010

(65) Prior Publication Data

US 2011/0058664 A1 Mar. 10, 2011

Related U.S. Application Data

(60) Provisional application No. 61/240,963, filed on Sep. 9, 2009, provisional application No. 61/265,632, filed on Dec. 1, 2009, provisional application No. 61/265,629, filed on Dec. 1, 2009, provisional application No. 61/310,121, filed on Mar. 3, 2010.

(51) Int. Cl.
*H02B 1/00* (2006.01)
*H05K 7/00* (2006.01)

(52) U.S. Cl.
USPC .............................. 361/641; 361/601; 361/728

(58) Field of Classification Search
USPC .......................... 361/601, 606, 625, 641, 807;
290/42–44, 53–55; 136/244–246, 291;
60/641.1, 641.8, 641.15, 698; 307/18,
307/22, 64–69, 72, 76, 84
See application file for complete search history.

(56) References Cited

U.S. PATENT DOCUMENTS

| 5,184,502 | A  | * | 2/1993  | Adams et al. ................. 73/31.01 |
|-----------|----|---|---------|----------------------------------------|
| 7,230,819 | B2 | * | 6/2007  | Muchow et al. .............. 361/601    |
| 7,334,697 | B2 |   | 2/2008  | Myers et al.                           |
| 7,469,541 | B1 | * | 12/2008 | Melton et al. ................. 60/641.1|
| 7,821,147 | B2 | * | 10/2010 | Du Bois .......................... 290/44|
| 2006/0137348 | A1 | * | 6/2006 | Pas ............................... 60/641.1|
| 2007/0219430 | A1 | * | 9/2007 | Moore .......................... 600/300 |
| 2008/0196758 | A1 | * | 8/2008 | McGuire ....................... 136/245  |
| 2009/0128085 | A1 | * | 5/2009 | Yang ............................. 320/101|
| 2010/0078942 | A1 | * | 4/2010 | Bois ............................... 290/54 |
| 2010/0205870 | A1 | * | 8/2010 | Cobb ............................. 52/79.1 |
| 2011/0146751 | A1 | * | 6/2011 | McGuire et al. .............. 136/245   |
| 2011/0278853 | A1 | * | 11/2011 | Capp et al. .................... 290/1 A |

FOREIGN PATENT DOCUMENTS

WO    PCT2007030535    3/2007

* cited by examiner

*Primary Examiner* — Mohammad Islam
(74) *Attorney, Agent, or Firm* — Cantor Colburn LLP

(57) ABSTRACT

A mobile power system includes a plurality of energy sources, a plurality of electronic and telecommunications components configured to convert power generated by the plurality of energy sources to direct current (DC) power, wherein the plurality of electronic and telecommunications components condition the DC power and direct the conditioned DC power to a Public Switch Telephony Network (PSTN), and one or more transportable housings configured to hold the plurality of energy sources and the plurality of electronic and telecommunications components during transport of the one or more housings.

15 Claims, 22 Drawing Sheets

MOBILE POWER SYSTEM

CROSS REFERENCE TO RELATED APPLICATIONS

This application claims the benefit of U.S. Provisional Application Ser. No. 61/240,963; filed Sep. 9, 2009; U.S. Provisional Patent Application No. 61/265,632; filed Dec. 1, 2009; U.S. Provisional Patent Application Ser. No. 61/265,629; filed Dec. 1, 2009; and U.S. Provisional Patent Application Ser. No. 61/310,121; filed on Mar. 3, 2010; all of which are incorporated herein by reference in their entirety.

BACKGROUND OF THE INVENTION

The present invention relates to power systems and more particularly, to mobile, self-contained power systems that can be easily constructed in an in-field environment. The self-contained power systems may include communications systems configured to provide monitoring and statistics for the self-contained power systems.

Electric power is typically routed from power generating stations along an electrical power grid to end users, such as home owners and businesses. While electric power from traditional electrical power grids is readily available in many locations throughout the world, there remain vast regions where no electric power is available. Even in locations where electric power may be available, there are a number of situations where an additional power source would be desirable to supplement any existing power scheme. In particular, there are many regions in the world where more than a majority of the people live without being connected to a power grid. For example, in India and other developing countries, a majority of the people live in villages that have no power. In addition, other infrastructure, such as paved roads, is likewise lacking and therefore, it is very difficult to even establish a traditional electrical power grid since it can be difficult to access such regions. Also, the building of a traditional electrical power grid requires a number of components including a network to connect power plants to multiple substations. The wiring from substations to customers is referred to as electrical distribution. Other components such as substations with step down transformers and the like are also required to deliver power to end consumers. Establishing a power transmission network is very costly and requires the development of a complex infrastructure that extends over a substantial number of miles to reach distant end users.

Over the recent years, there has been a significant movement to develop alternative energy sources. Alternative energy generally refers to any source of usable energy that is intended to replace fuel sources without the undesired consequences of the replaced fuels. Two of the more studied alternative energy sources are solar and wind power. Solar and wind power generation systems are known and can be applied in a number of different applications; however, there are disadvantages associated with each. For example, these energy sources generally have not been standardized and therefore, they must be custom built for each application and/or at each desired site. This results in the systems being costly. In addition, these custom built systems typically require days to assemble and similarly, to disassemble. Moreover, traditional solar and wind power systems are not modular and typically, once a particular system has been designed, it is very difficult to add components to the system without a costly redesign or modification.

Conventional power transmission systems are neither intended nor are they designed for easy transportation to a desired location. As mentioned above, many areas where people do not have electric power are remote areas of countries that are far from more developed cities and more developed infrastructure. Also, conventional power generation systems do not provide adequate versatility for receiving power from different types of power generating devices, and for supplying power to a variety of different power receiving devices requiring different types of electrical supply. Many power generating systems are designed with a single type of power generating device, such as gas powered generator, solar powered generator, wind powered generator, etc. As a result, interchanging power receiving devices from the power generating devices is very difficult if not impossible in existing power generating systems.

The present invention provides a power generating system that overcomes the above-discussed deficiencies of traditional power generating systems, while also providing real-time monitoring and statistics for said power generating system.

BRIEF DESCRIPTION OF THE INVENTION

According to an example embodiment, a mobile power system includes a plurality of energy sources, a plurality of electronic and telecommunications components configured to convert power generated by the plurality of energy sources to direct current (DC) power, wherein the plurality of electronic and telecommunications components condition the DC power and direct the conditioned DC power to a Public Switch Telephony Network (PSTN), and one or more transportable housings configured to hold the plurality of energy sources and the plurality of electronic and telecommunications components during transport of the one or more housings.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1A:
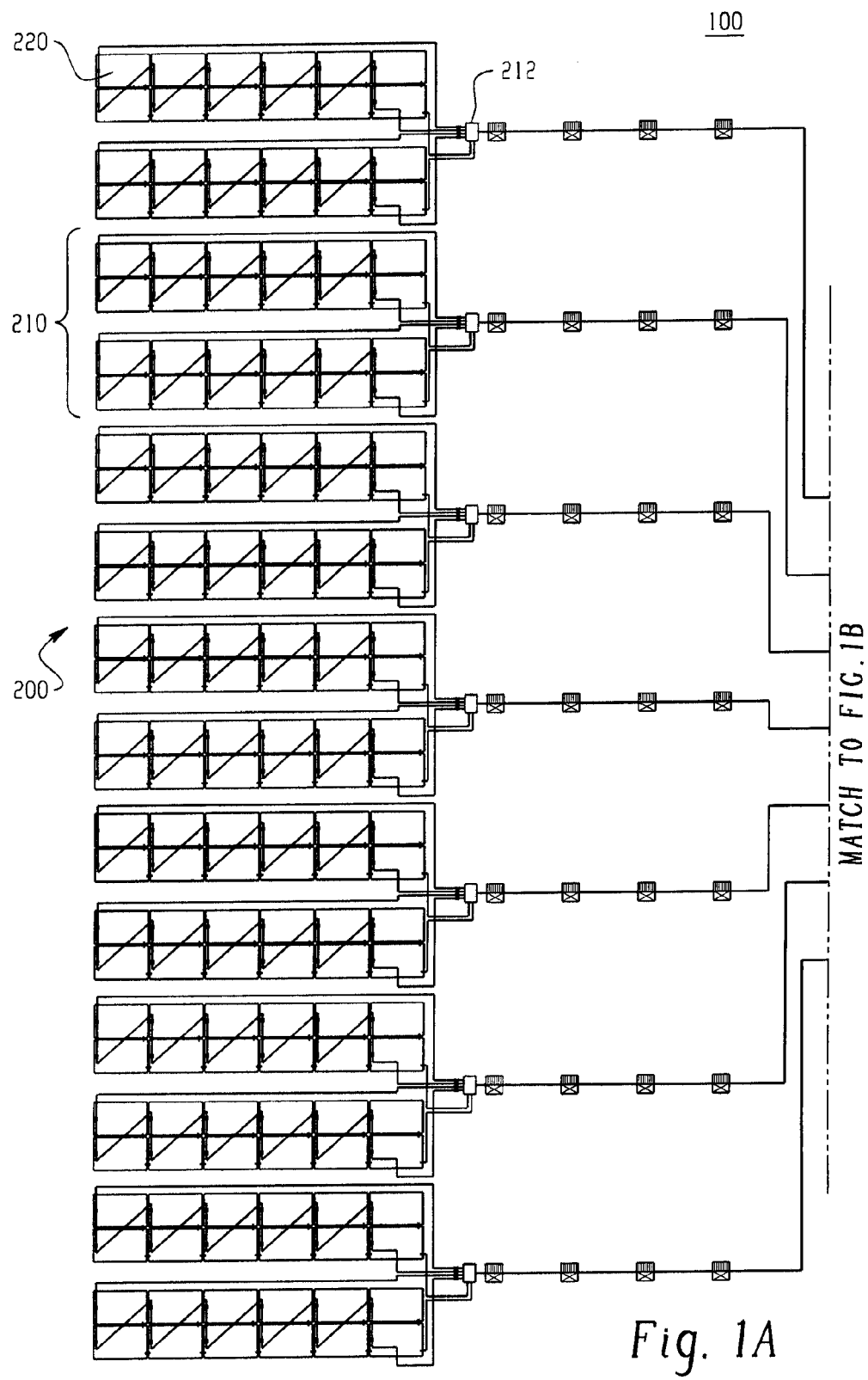
FIG. 1 is a schematic view of a mobile power system according to a first embodiment of the present invention.
Figure 1B:
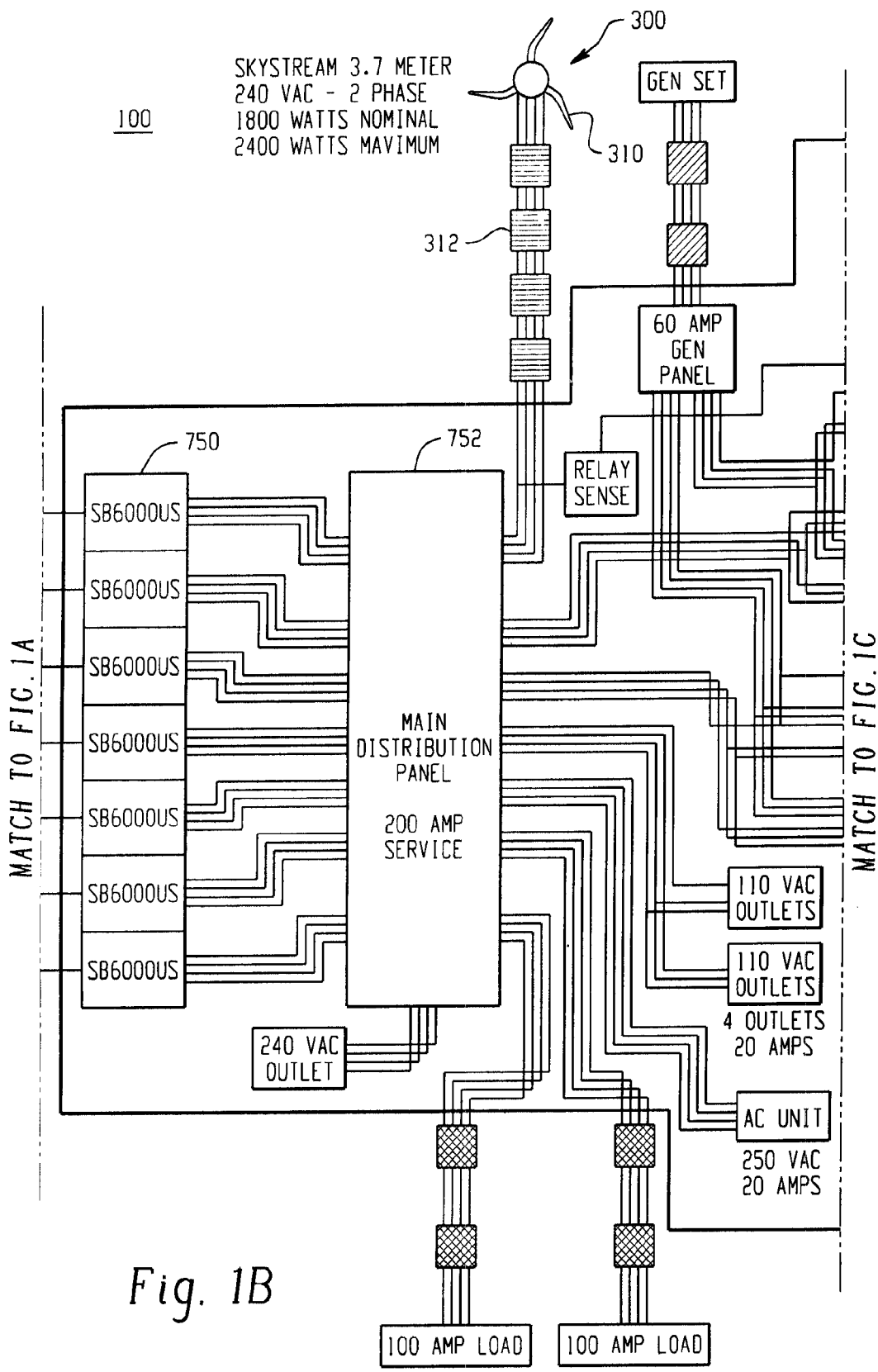
Figure 1C:
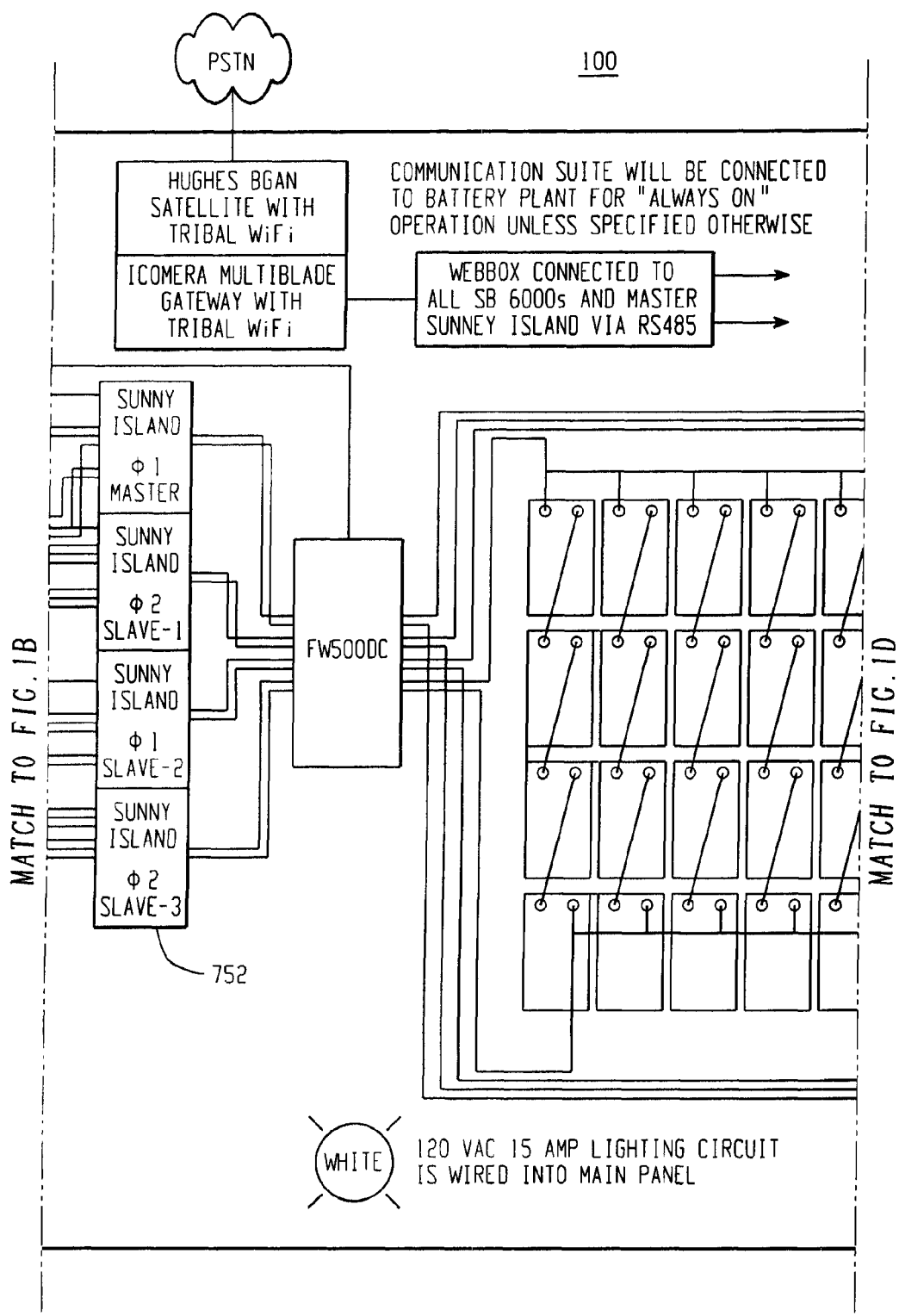
Figure 1D:
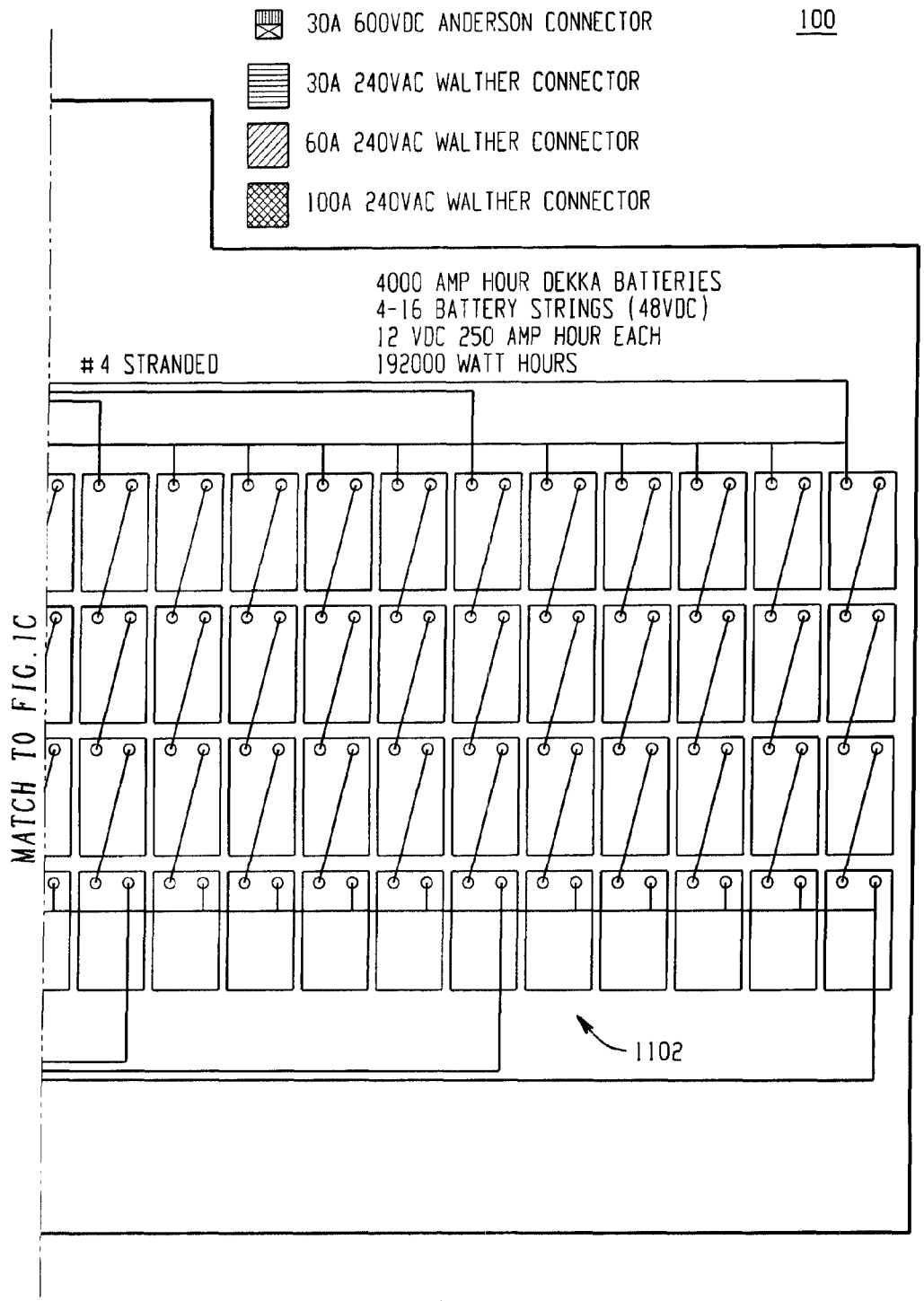

The detailed description explains embodiments of the invention, together with advantages and features, by way of example with reference to the drawings.

DETAILED DESCRIPTION OF THE INVENTION

The mobile power system 100 is generally formed of a number of components. For example, the mobile power system includes a number of power generating devices that are alternative sources of energy that can be harnessed at an in-field location, such as a remote village location. In accordance with one embodiment of the present invention, the mobile power system 100 includes at least a first alternative energy source 200 and a second alternative energy source 300. It will be appreciated that the mobile power system 100 can include more than two alternative energy sources. In the illustrated embodiment, the first alternative energy source 200 is a solar based energy source and the second alternative energy source 300 is a wind based energy source. More specifically, the energy source 200 includes a solar powered generating device 200 and the energy source 300 includes a wind powered generating device 300 as described in detail below.

Figure 9:
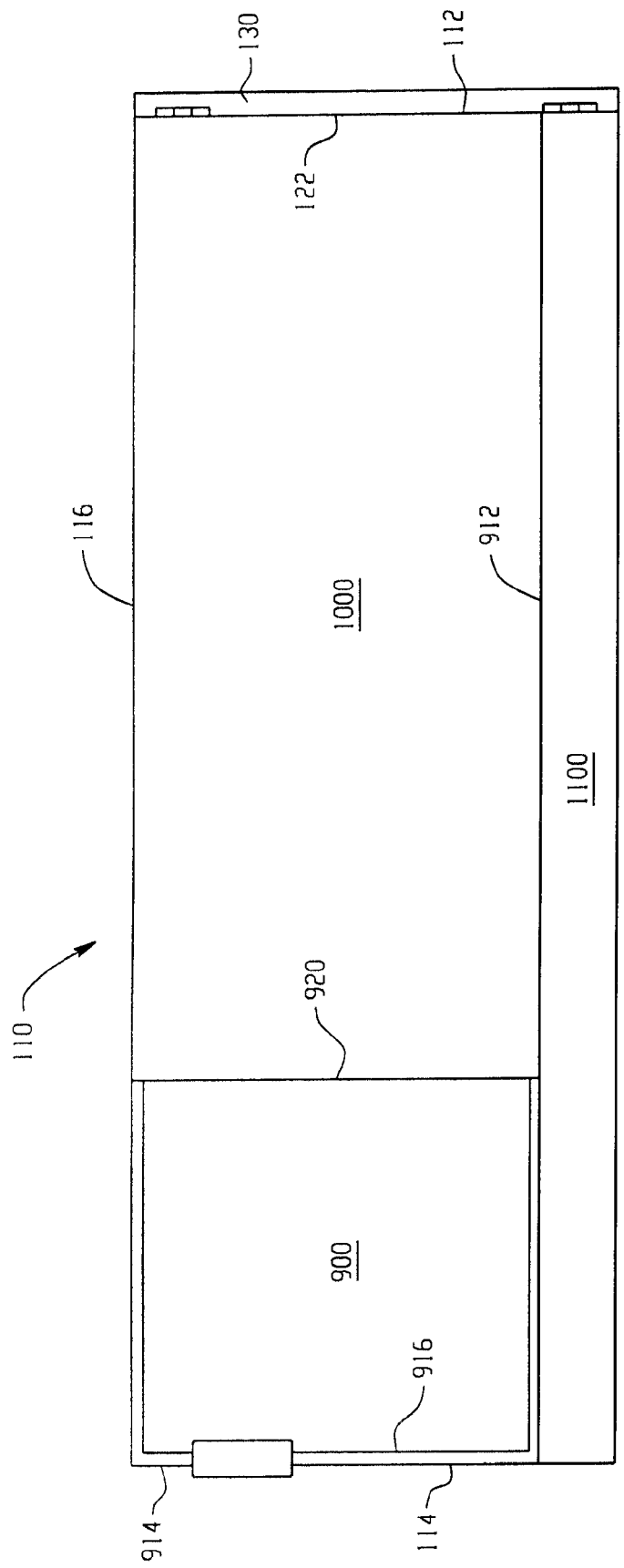
FIG. 9 is a cross-sectional view of an exemplary housing of the mobile power system.

In the embodiment of FIG. 1, a cross-sectional top-down view of the housing 110 is shown in FIG. 9 to provide a view of the mobile power system components present in at least one of the housings when the system 100 is deployed and set up to generate power. The housing 110 will be described in greater detail below, but in this embodiment the housing 110 is in the form of a standard International Organization for Standardization (ISO) container and includes thick support pillars (not shown) arranged vertically at each corner of the housing 110. The support pillars provide structural integrity for the housing 110 and allow the containers to be stacked and easily moved. Along the length of the housing 110, additional support pillars and support structure can be formed. In another embodiment, the housing 110 can have any shape and size and may be in the form of another standard container, such as a standard Internal Aircraft/Helicopter Slingable Unit (ISU®) container.

Unlike some conventional mobile power systems, the mobile power system 100 of the present invention is configured so that the solar powered generating device 200 is not directly mounted and supported by the housing 110 itself. Instead, the major components of the solar powered generating device 200 are located remote from the housing 110; however, as described below, the solar powered generating device 200 is in full communication with the electronic equipment and other equipment that is located in the housing 110. In this manner, increased versatility is provided since the solar powered generating device 200 is not limited to being retracted directly from the housing 100 or otherwise mounted directly thereto. In some settings, it may be difficult (e.g., due to landscaping) for solar equipment, such as photovoltaic panels, to be extended from the housing 110 due to the presence of trees, rocks, waterways, etc. In the present invention, the solar powered generating device 200 can be located a short distance from the housing 110 and therefore, can be positioned at an optimal location, such as a cleared field or the like, while permitting greater versatility as to where the housing 110 needs to be located.

FIG. 1 further illustrates a top-down schematic view of an exemplary solar panel array 210 of the solar powered generating device 200 of the mobile power system 100. The solar panel array 210 can include a plurality of photovoltaic devices 220 of any conventional configuration for converting solar energy to electrical energy. The photovoltaic devices 220 can be formed in any conventional shape, such as the flat, rectangular solar panel shape illustrated in FIG. 1.

A plurality of the photovoltaic devices 220 can be coupled together in any conventional manner to form the solar panel array 210 as described below. The exemplary embodiment of FIG. 1 illustrates a total of 12 panels 220 per solar panel array 210. A total of 14 arrays are deployed for the mobile hybrid power system 100. There are any number of different photovoltaic devices (modules) 220 that can be used in the practice of the present invention. For example, one photovoltaic module 220 is available from BP Solar under the trade name/product identifier BP 4175, which is a high-efficiency photovoltaic module using silicon nitride monocrystalline silicon cells. Alternatively, other suitable photovoltaic modules 220 are available from XL Telecom & Energy Ltd. under the trade name/product identifier XL 24195.

Figure 2:
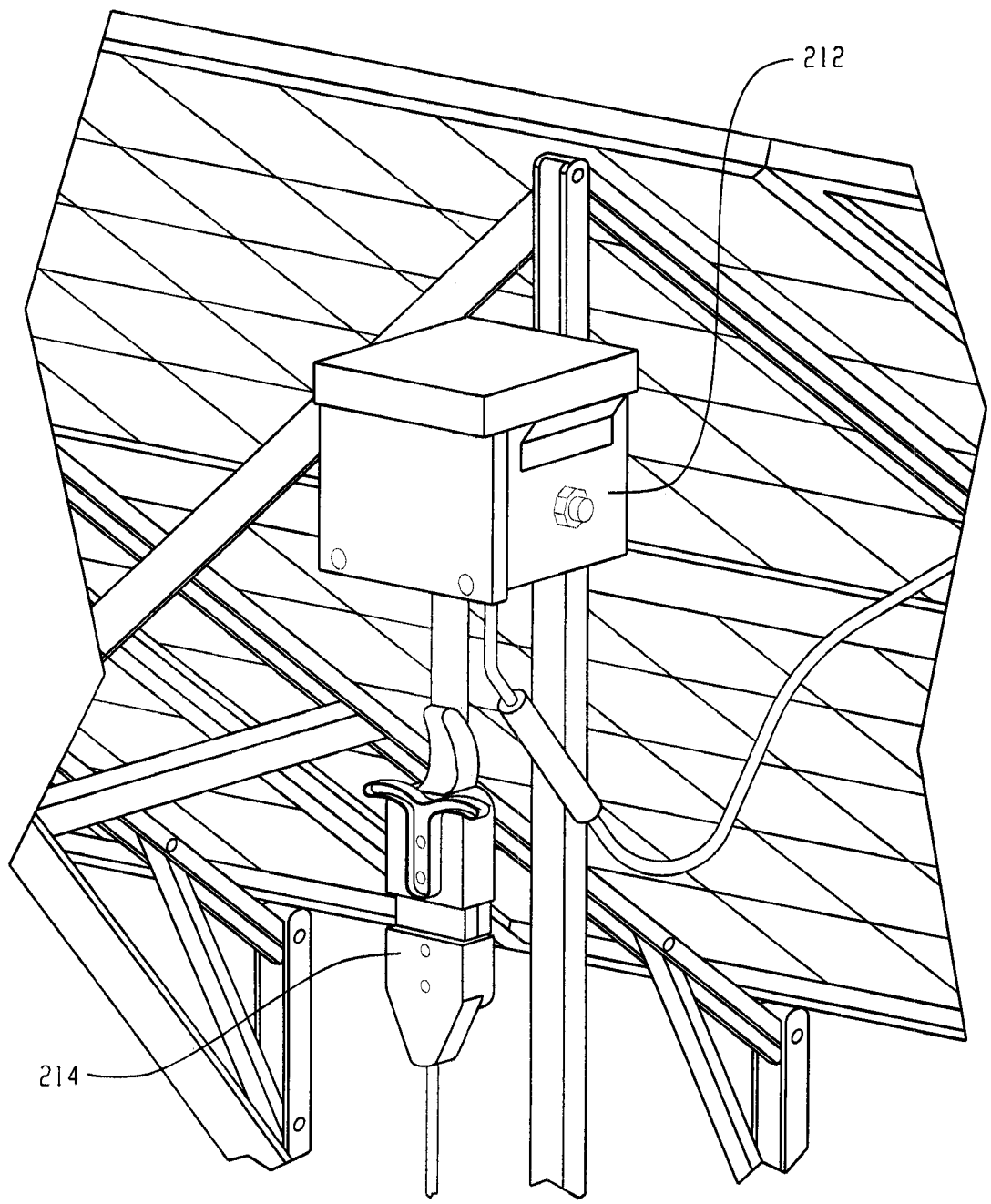
FIGS. 2 and 3 are perspective views of a connection box and electrical coupling members for electrically connecting the solar power generating devices to the electrical components within the housing.
Figure 3:
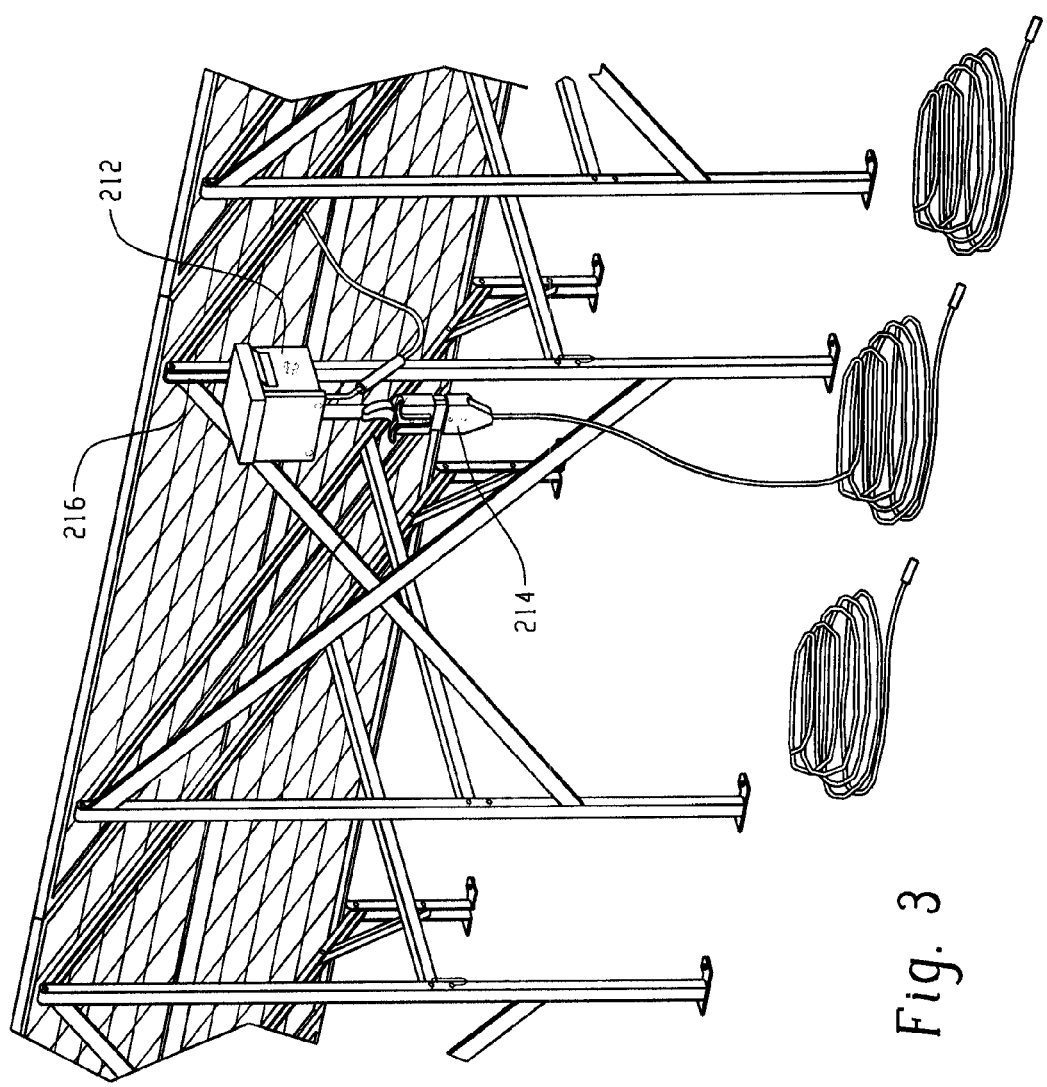

It will be understood that appropriate electrical connections are provided for electrically coupling the photovoltaic devices 220 together and allowing for the connection thereto of a unitary power output cord for an input to the housing 110. For example and as shown in FIG. 1, a number of photovoltaic devices 220 can be hardwired together through electrical lines so that the solar panel array 210 includes a single electrical coupling member, such as a female connector, configured to receive a mating electrical coupling member of a power output cord connected between the solar panel array 210 and the housing 110. Alternatively, each photovoltaic device 220 of the solar panel array 210 can include its own power output cord connecting to the housing 110. The power output cord(s) extending from each of the solar panel arrays 210 can be combined together at one or more connection boxes coupled to an exterior surface of the housing 110. In the embodiment of FIG. 1, a connection box 212 is used to electrically interconnect two solar panel arrays 210, or 24 individual solar panels 220. The connection boxes 212 are in electrical communication with the housing 110 and, as will be described below, more specifically the power components disposed within the housing 110. FIGS. 2 and 3 illustrate exemplary embodiments of one assembly system for interconnecting the solar panel arrays with connection boxes. FIGS. 2 and 3 further illustrate the connection box 212 and the electrical coupling members 214 configured to electrically couple the solar panel arrays 210 to the housing 110. The electrical coupling members 214 can further include color coded connectors to aid a person deploying the mobile hybrid power system in correctly connecting the solar powered generating device 200. As shown in FIG. 3, the connection box 212 can further include a hanger attachment 216 configured to removeably attach the connection box to a support beam of solar panel array 210. This can prevent the connection box 212 from being a tripping hazard around the solar panels and will help to reduce the chance of disconnection from the housing 110 and/or damage to the connection box 212.

A support frame can be used to properly position the solar panel array and support the photovoltaic devices 220 at desired angles relative to the ground. The support frame can include one or more support members that can be coupled to a bottom surface of the solar panel array 210. For example, the support members can include a bottom base and a vertical support member along with other support members (rails) that cause the photovoltaic device 220 to be supported and maintained at an angle relative to the ground. For example, the photovoltaic devices 220 can be angled toward the sun during the in-field installation. The support members can easily be broken down and stored in convenient manner without requiring much storage space. For example, the support members can be tubular structures that can be joined to one another with couplers that result in an interconnected structure being built. By being formed with tubular components, the support frame is lightweight and therefore, can easily be manipulated as when assembling the parts.

Figure 4:
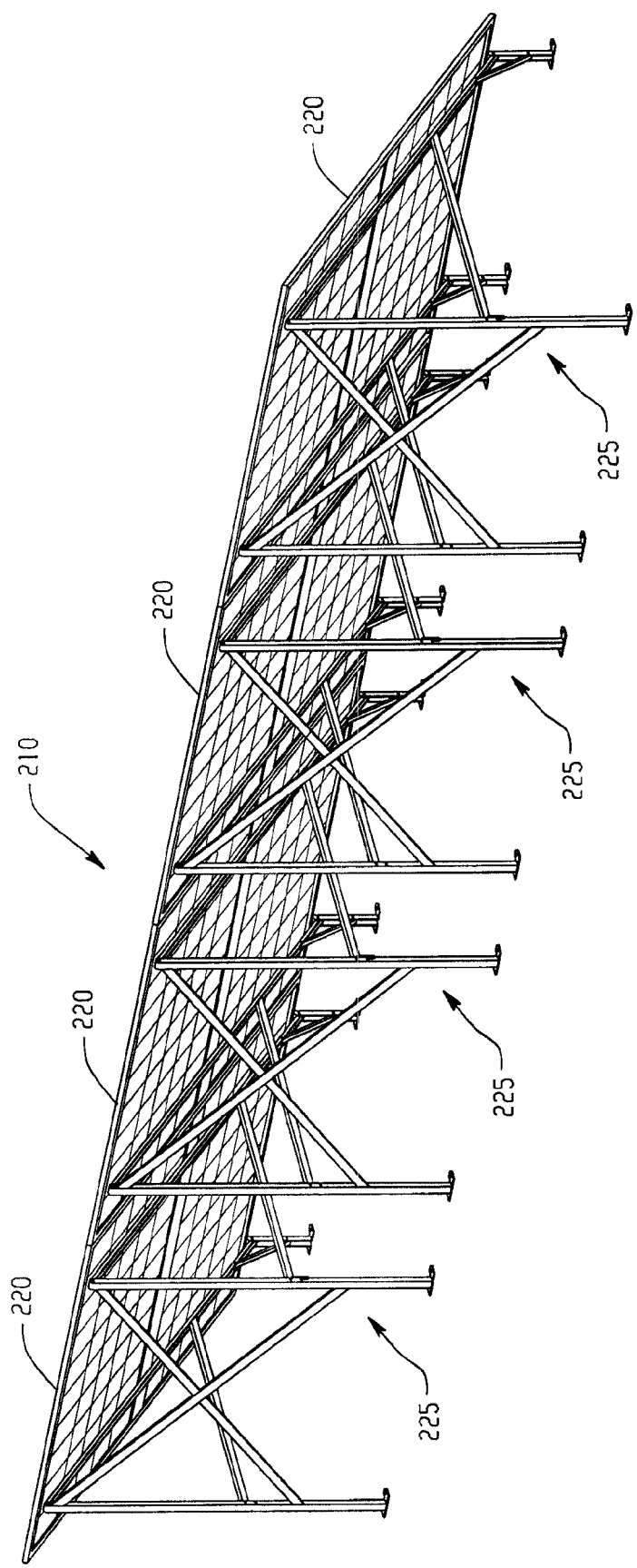
FIG. 4 is a side perspective view of an exemplary embodiment of solar panel array with collapsible frame member for the mobile power system.

In one embodiment, as shown in FIG. 4, a number of photovoltaic devices 220 (panels) are arranged in a side-by-side manner and are coupled to one another and further, the joined devices 220 include a common frame member 225 that is designed to easily be deployed in the field to cause the joined devices 220 to be positioned at an elevated, angled nature relative to the ground. More specifically, the joined devices 220 can be stored within the housing 110 during transportation and the frame member 225 is likewise already coupled to the joined devices 220 so that once the system 100 reaches its intended destination, the joined devices 220 are simply removed from the housing 110 and the frame member 225 is extended to a fully deployed condition where the joined devices 220 are displayed in the desired angled position. The frame member can be designed so that the solar panel array 210 can be broken down into any number of individual photovoltaic devices 220 to maximize the number of panels that can be packed in the housing 110. For example, an individual frame member 225 can be attached to each panel 220, wherein the frame members can then be joined together to securely form the solar panel array 210. In another embodiment, the individual frame member 225 can be attached to two or more panels 220 of the solar panel array 210.

Figure 5:
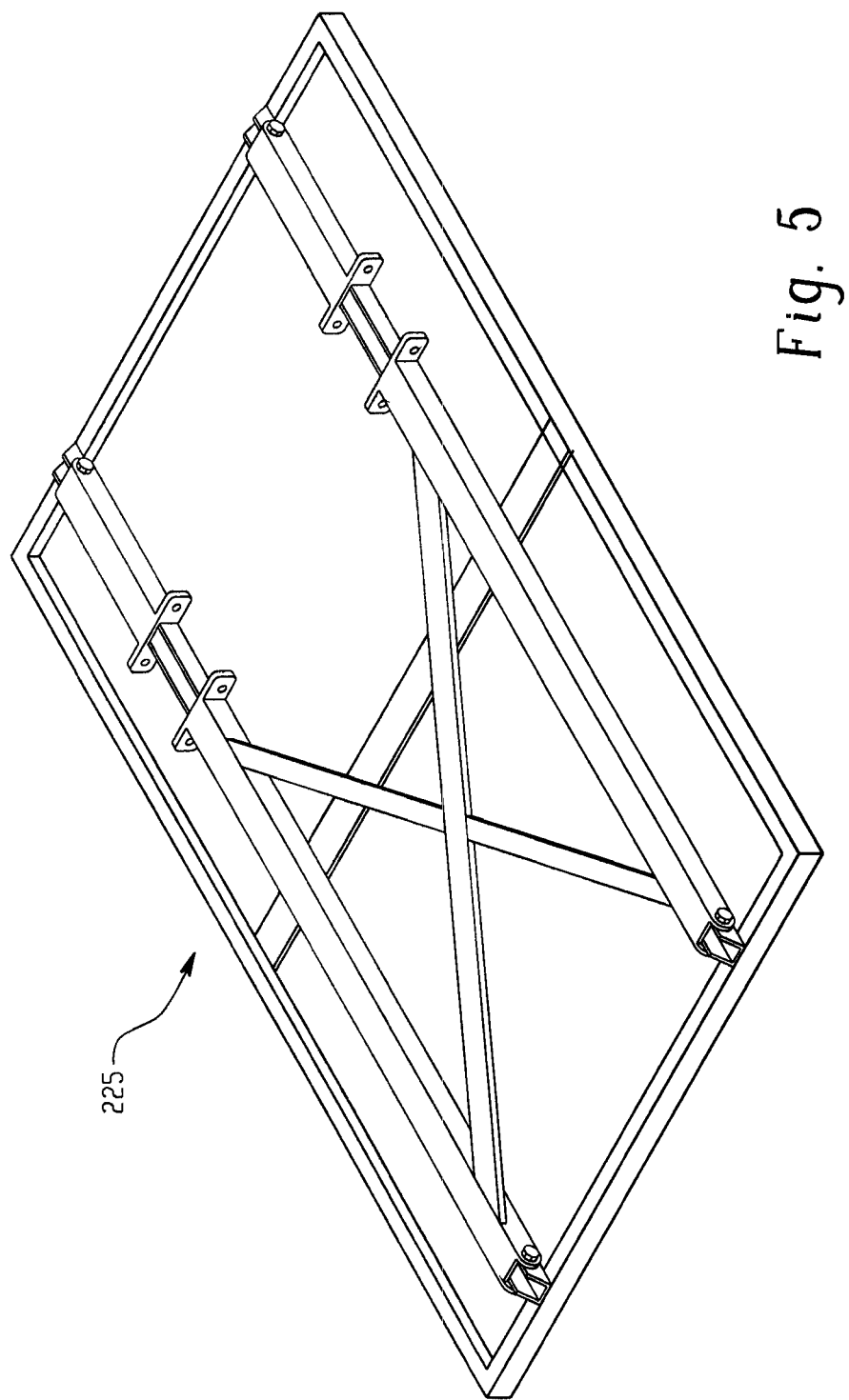
FIGS. 5-7 are perspective views of an exemplary embodiment of the collapsible frame members for deploying the solar panels.
Figure 6:
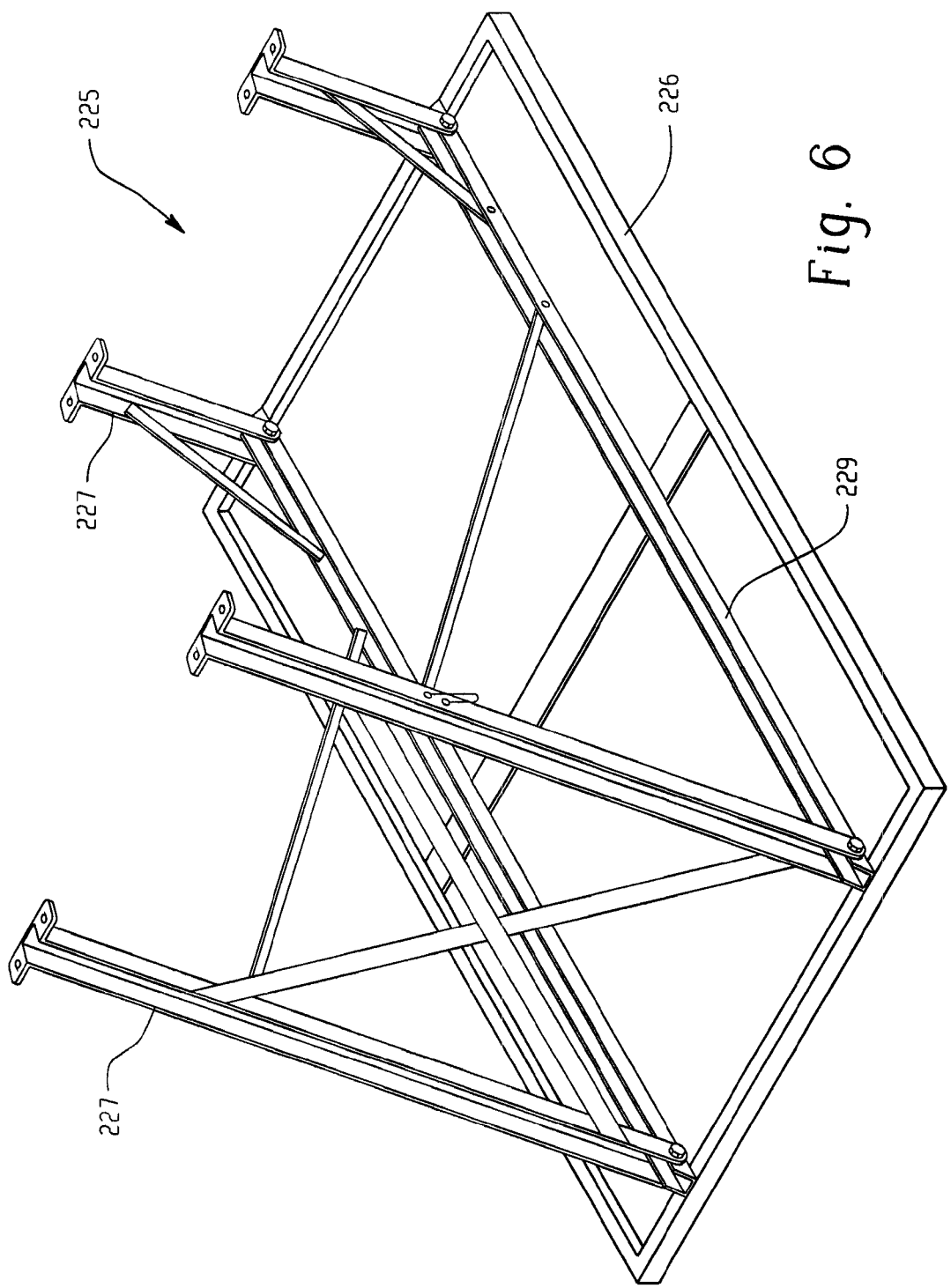
Figure 7:
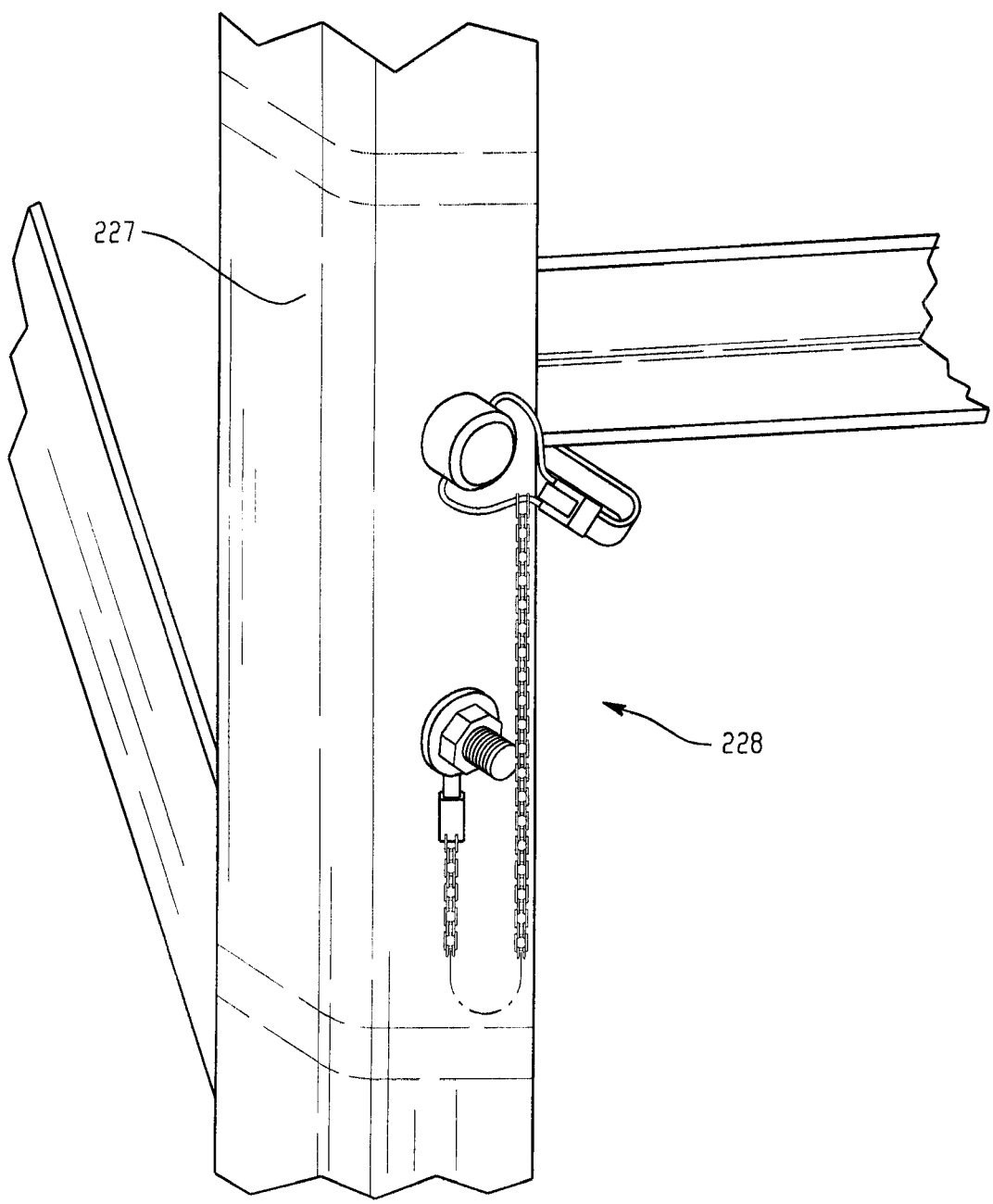

Turning now to FIGS. 5-8, an exemplary frame member 225 is shown in more detail. As shown in FIGS. 5 and 6, the frame member 225 is designed so that it is easily foldable and more particularly, it pivots between a retracted position (shown in FIG. 5) in which the frame member 225 is located adjacent or proximate the rear surfaces of the devices 220 and an extended position (shown in FIG. 6) in which the frame member 225 extends outwardly from the devices 220 and provides ground contacting members seat against the ground. In one embodiment, the frame member 225 is similar to a folding table structure in that it includes pivotal legs 227. As shown in FIG. 6, the frame member 225 can include two different sets of legs with each set of legs having different lengths. In this manner, the longer legs 227 serve to elevate one end of the joined devices 220, while the shorter legs 227 serve to slightly elevate the other end of the joined devices 220, thereby causing the joined devices 220 to have an angled position in use. When the pivotal legs 227 are extended, the legs can be secured in this position with a locking mechanism 228 configured to keep the legs from collapsing back into the storage position. One example of a locking mechanism 228 is a cotter pin, such as the one shown in FIG. 7.

Figure 8:
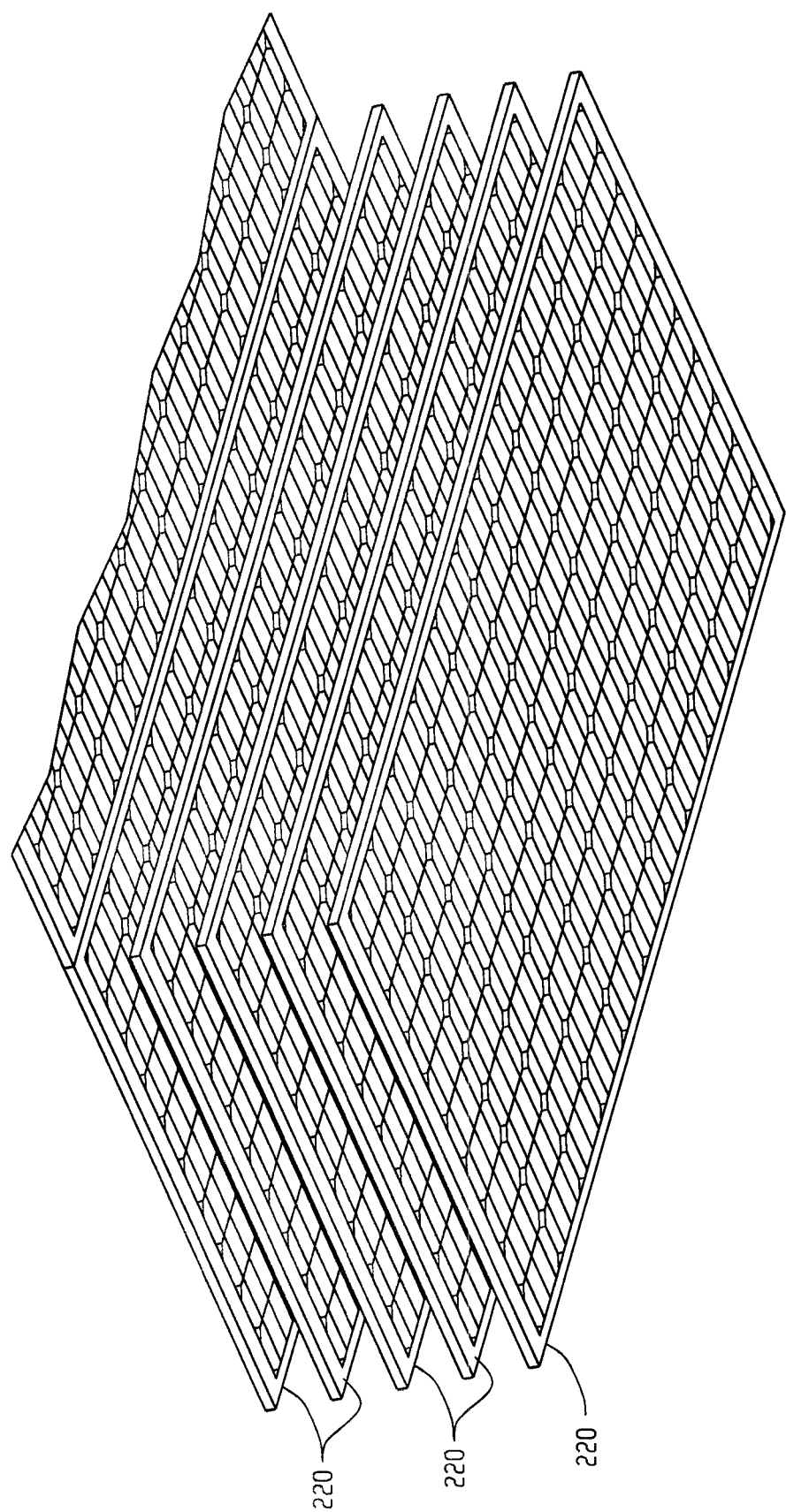
FIG. 8 is a perspective view of solar panels stored within the housing and ready for transport.

As shown in FIG. 5, the pivotal legs 227 are designed such that when collapsed the legs are compact and approximately in a co-planar storage configuration in which the pivotal legs assume an approximately horizontal position alongside one another, the major portions of the cross support members 229 are nested approximately within the recess formed in the pivotal legs 227. In one embodiment, the total thickness of the panel with the frame member 225 collapsed is the thickness of the pivotal leg 227 plus the panel 220 thickness. In another embodiment, the total thickness of the panel with the frame member 225 collapsed is simply the panel 220 thickness, as the frame member 225 is attached to the panel 220 such that the collapsed legs 227 are disposed within the recess of the panel framing 226 on the underside of the panel 220. With the legs 227 thus collapsed, their lower or outer surfaces are preferably approximately flush with the bottom surfaces of the peripheral framing 226 about the panel 220. Again with this arrangement, the solar panel, when in the frame member 225 is in a collapsed condition, has an overall depth which approximately equals the depth of the panel. By utilizing the thinnest possible frame member 225 when in the collapsed, stored position, the least amount of space is occupied by the panels 220 within the housing 110. Therefore, this efficient use of space allows for more panels to be shipped in one housing container, or other additional components to be included. FIG. 8 illustrates a plurality of solar panels 220, with their frame members 225 in a flush collapsed position, stored within housing.

The number of panels (devices 220) that are joined together is selected so that not only can the joined panels be easily stored in the housing 110 during transportation but also the joined panels 220 can easily be carried by persons at the desired installation site. One of the advantages of the system 100 of the present invention is that it can easily be assembled and operated by unskilled persons at the in-field site. In other words and unlike conventional systems, the components of the system 100 are designed and packaged in a user friendly manner and in a manner that does not require skilled persons for assembly thereof. In addition, the ease of use significantly reduces set-up time, etc.

In addition, the joined nature of the panels permits sets of panels to be loaded into the interior compartment (e.g., compartment 1000 as shown in FIG. 9) of the housing 110 in a simple manner that likewise permits easy unloading of the panels 220 at the site. As shown in FIG. 1, a number of joined panel assemblies can be arranged in a side-by-side manner to form a longer array of photovoltaic devices 220 that can be placed at a remote location relative to the housing 110 (the frame of the devices 220 is not attached to the housing 100).

The wind powered generating device 300 (shown more clearly in FIG. 1B) can be of conventional design. As is known, there are generally two types of wind machines (turbines) that are used today based on the rotating shaft (axis) (e.g., horizontal-axis wind machines and vertical-axis wind machines). Like most wind machines, the wind powered generating device 300 is a horizontal axis type and includes blades 310 that catch the wind and spin and a generator that is part of a turbine that converts the mechanical energy into electricity. It will be appreciated that a connector cable 312, for example a 30 ampere/240 volt A/C connector, carries electricity to the transmission line.

Different types of wind powered generating devices can be used with the mobile power system as described herein. In one embodiment, for example, a tower type wind powered generating device can be used. In another embodiment, a lattice type frame can be used to support a wind powered generating device. The tower type wind powered generating device is formed of a number of elongated pole segments that are coupled to one another to form the assembled tower wind powered generating device. The wind turbine sits atop the assembled tower. The typical components of a wind turbine include but are not limited to a gearbox, rotor shaft, generator and brake assembly, with the blades 310 being part of a rotor component that converts wind energy to low speed rotational energy. The generator component converts the low speed incoming rotation to high speed rotation suitable for generating electricity.

In contrast to a tower type design, the frame structure of a lattice type wind powered generating device is formed of a number of lattice frame sections. The lattice frame sections can be assembled to one another to form the completed lattice frame. The lattice frame tapers inwardly toward the turbine. A bottom of the lattice frame is coupled to a support structure that is itself securely attached to the housing 110. An exemplary support structure has a first frame member that is mounted to the housing 110 (e.g., mounted to the first side wall 118 of the housing 110). In addition, there are a number of additional frame members that are coupled to and extend outwardly from the first frame member. For example, the support structure can include second and third frame members that extend outwardly from the first frame member (e.g., at a right angle thereto) and are spaced apart from one another to define a space for receiving the lattice frame. The frame structure includes a base that is disposed on the ground and is securely attached to the support structure.

In an exemplary embodiment, the mobile power system 100 can include two or more wind powered generating devices 300, with the other wind powered generating device being mounted from a diagonally opposite corner of the housing 110. In other words, two wind powered generating devices can be located at diagonally opposite corners of the housing 110. In one embodiment, the tower and lattice frame structure has a height of about 80 feet and a distance between the turbines is about 66 feet to allow for a proper clearance between the turbine blades.

As will be described below, each of the tower and lattice frame structure is designed to be dissembled and stored as individual components that can be stored in the housing 110. As with all components of the solar powered generating device, all of the components of the wind powered generating device are configured to fit within the housing 110 during storage and transportation.

More specifically and with reference to FIG. 9, housing 110 can be specifically compartmentalized or otherwise arranged so that the components stored in the housing 110 can be easily removed in a predetermined manner that permits efficient assembly of the components of the system 100. For example, the housing 110 can include a first region or section 900, a second region or section 1000, and a third region or section 1100. The first section 900 is in the form of a room that is formed in a rearmost location of the housing 110. As used herein, the term "rearmost location" generally refers to a region of the housing that is opposite the end of the housing which includes the door/opening. The first section 900 can extend the entire width of the housing 110 and can be defined by an inner wall or partition 920. The inner wall 920 extends from a floor 912 to the top wall 116 of the housing. As described below, the floor 912 is a false floor in that it does not represent a bottommost surface of the housing 110; however, it can extend from the second end 114 to the first end 112 of the housing.

An exemplary manner of raising the assembled lattice frame wind powered generating device into an upright position will now be described. First, the lattice frame structure is assembled and the turbine 320 is securely mounted to the top of the lattice frame structure. Next, in accordance with the present invention, a lift mechanism that is integral to and incorporated into the housing 110 is used. For example the housing 110 can include mounting features and other equipment that support a gin pole assembly. As will be appreciated by those skilled in the art, the gin pole assembly generally consists of three parts, namely, (1) a pulley assembly to provide mechanical advantage when lifting, (2) a pole 410 to gain height needed for the lift, and (3) a clamp assembly to attach everything to the tower or lattice structure.

To use the gin pole assembly, the clamp and pulley are assembled on a pipe. To erect the tower, the gin pole is mounted to a coupling member that is located on the top wall of the housing 110. The coupling member permits attachment and detachment of one end of the gin pole and permits pivoting thereof. The gin pole includes an opposite other end that includes the pulley assembly or the like to facilitate the raising of the lattice frame. The coupling member and the gin pole are located at one end of the housing. At or near the opposite end of the housing 110, a power or hand crank wench is disposed. One or more cables is routed through the wench and through the pulley assembly and are connected to one or more attachment points along the length of the assembled tower. To raise the assembled lattice frame, a base portion of the lattice frame is coupled to the support frame on the ground. This coupling permits pivoting of the lattice frame 350 to the fully raised position.

In one embodiment, a mount bottom anchor plate is attached to the side wall 118 of the housing 110 in one corner thereof. In particular, the anchor plate is disposed at the bottom of the side wall 118. The anchor plate is an L-shaped bracket having a first wall that is attached to the side wall 118 and a second wall that is perpendicular to the first wall. The second wall includes fasteners (e.g., bolts arranged in a circular or in some other pattern). The first tower section has a first end that has a flange with openings that receive the fasteners and then bolts are used to fasten the first tower section to the anchor plate. An opposite second end includes a flange that includes fasteners (e.g., bolts) extending therefrom. This results in the first tower section being disposed in an upright manner.

In another embodiment, a top anchor plate is mounted to both the first tower section and the housing 110. In particular, the top anchor plate has a first section that has a number of openings formed therein to receive the fasteners. Nuts are then used along the top surface of the first section to securely attach the top anchor plate to the first tower section. A second section extends over the top wall 116 of the housing 110. The top wall 116 of the housing 110 includes prearranged, preformed openings in the corner of the housing 110 and fasteners pass through complementary openings formed in the second section and the openings in the top wall 116.

In another embodiment, a first part of the portable gin pole assembly is mounted to a mounting feature that is formed as part of the second section, while support legs or arm of the assembly are connected to mounting features that is formed as part of the first section. The first section also includes a pivot mount for assisting in raising the tower as explained below. A second tower section includes one end that placed in the pivot mount. A cable is attached to one or more points along the length of the second tower section. The cable is routed through the gin pole assembly (e.g., through a pulley or the like). The assembly can be a ratchet based mechanism and therefore, by ratcheting the assembly, the second tower section is raised. As the second tower section is raised and pivoted, openings formed in a flange at the end of the second tower section are aligned with an receive fasteners (e.g., fasteners). Nuts or the like are used to securely attach the second tower section to the first section and thus, the first tower section. The assembly can conveniently remain in place after raising of all of the tower sections.

In one embodiment, the housing 110 can further include an opening 914 formed in the second wall 114 and configured to accommodate a cooling vent/unit. The opening 914 is typically formed in an elevated location relative to the ground (e.g., near the top wall 116). In another embodiment, the housing 110 has no openings other than the opening 122 sealed by the housing doors 130 at the first end 112 of the housing. As will be explained in greater detail below, it is advantageous to keep the housing 110 free from openings, holes, punctures, and the like. As such, in an exemplary embodiment, there are no mechanical attachments to the interior of the housing that cause a puncture or hole from the interior through to the exterior of the housing, such as bolt holes, and the like.

Figure 10:
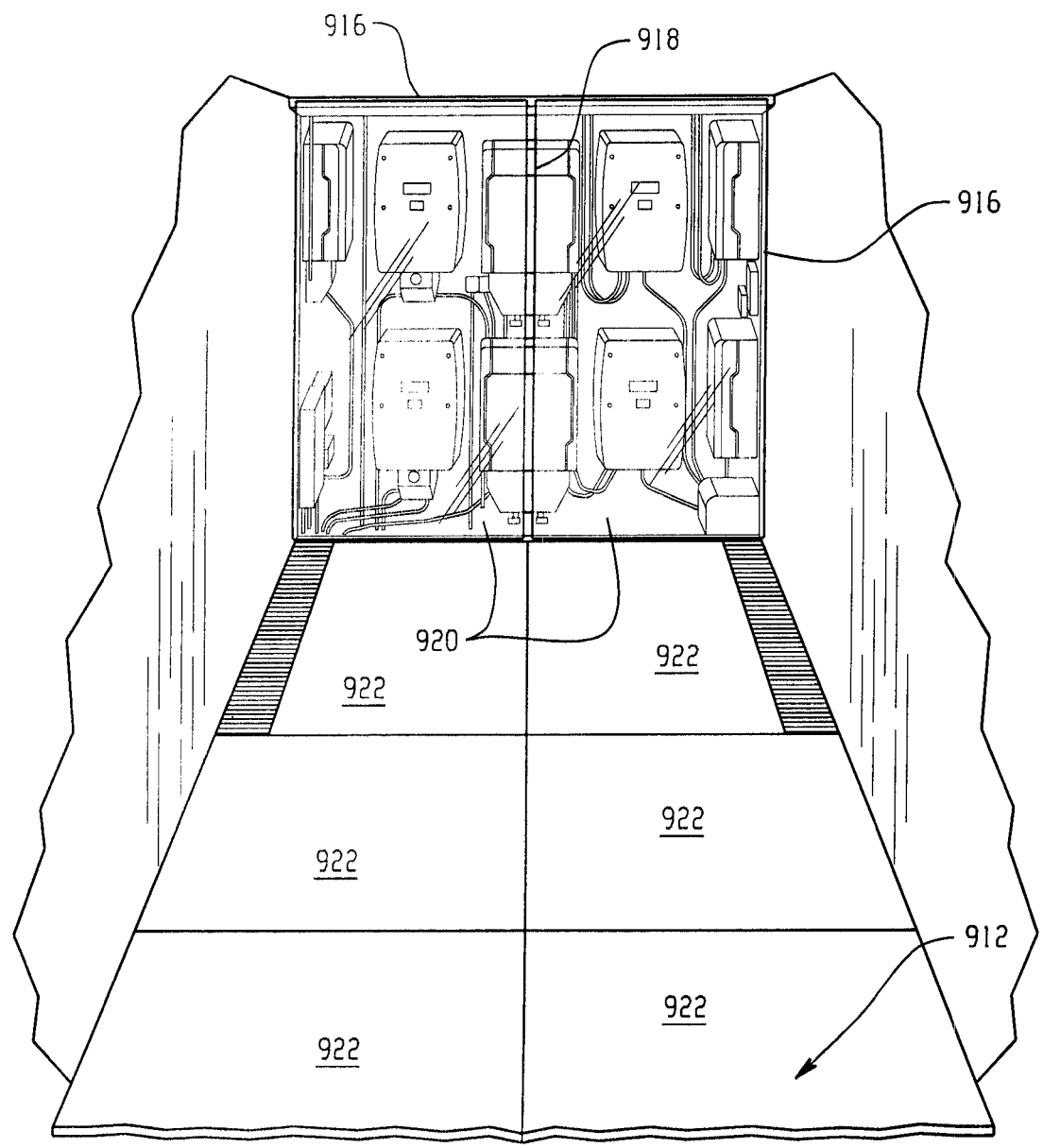
FIG. 10 is a perspective view of an exemplary embodiment of a first section of the housing of FIG. 9.

In order to prevent such attachment punctures or holes on the interior walls of the housing, false walls can be disposed in the first section 900. In one embodiment, a frame 916 having the shape of the first section 900 can be slid into the housing through the opening 122. The frame 916 has dimensions only slightly smaller than the interior dimensions of the housing in the first section 900, such that the frame 916 creates false walls in the first section 900. The false walls of the frame 916 can be used for attachment of system components, thereby preventing the need to attach equipment through the walls of the housing 110. The frame 916 can be formed of any material capable of supporting the desired system components attached thereupon. In one embodiment, the frame 916 can be formed of ¼ inch thick steel. As shown in FIG. 10, one embodiment of the frame 916 can further include an optional partition 918 to separate the first section 900. The partition 918 can be used to separate the first section 900 into two or more sections. The first section 900 can further include an inner wall 920. The inner wall 920 can be attached to the frame 916 and can include a lockable door disposed within the wall 920, or the inner wall can be hingeably attached to the partition 918 such that either side of the inner wall 920 can be swung open to access the first section 900 on either side of the partition 918. In one embodiment, the inner wall 920 is formed of a transparent material, such as Plexiglas®, so that the electronic equipment in the room 900 can be monitored without repeated opening of the inner wall door(s).

In an exemplary embodiment, the first section (i.e., room) 900 is intended to be an electronics room that houses the electronic equipment of the system 100. For example, the room 900 can house inverters, batteries, and other power electronics. Such equipment can be quite heavy, and therefore the frame 916 described above advantageously provides a surface upon which to attach/hang the electronic equipment. As is known, the electronic equipment generates heat and needs to have some cooling and therefore, the cooling unit can be installed in the opening 920. It will be appreciated that the cooling unit can be installed prior to transportation or it can be installed in the field. When the frame 916 is used in the first section 900, however, a cooling unit is employed at the other end of the housing 110 in a bulkhead wall that will be described in more detail below. As such, the cooling unit will cool the entire interior of the housing (rather than just the room 900), and the housing does not need to be punctured or otherwise altered to utilize the cooling unit.

The second region 1000 is located above the floor 912 and extends from the inner wall 920 of the room 900 to the first end 112. This region is the largest region in terms of volume and is intended to store all of the equipment of the solar powered generating device 200 (i.e., the solar arrays) when not in use. In particular and as mentioned herein, in one embodiment, a predetermined number of the photovoltaic devices 220 are arranged and coupled together to form a subassembly. The foldable nature of the support frames of the joined photovoltaic devices 220 permits the joined frames to be conveniently stacked and arranged in a side-by-side manner. In addition, the second region 1000 can also store components of the wind powered generating device 300, a diesel generator, or other like components for the mobile power system 100.

Figure 11:
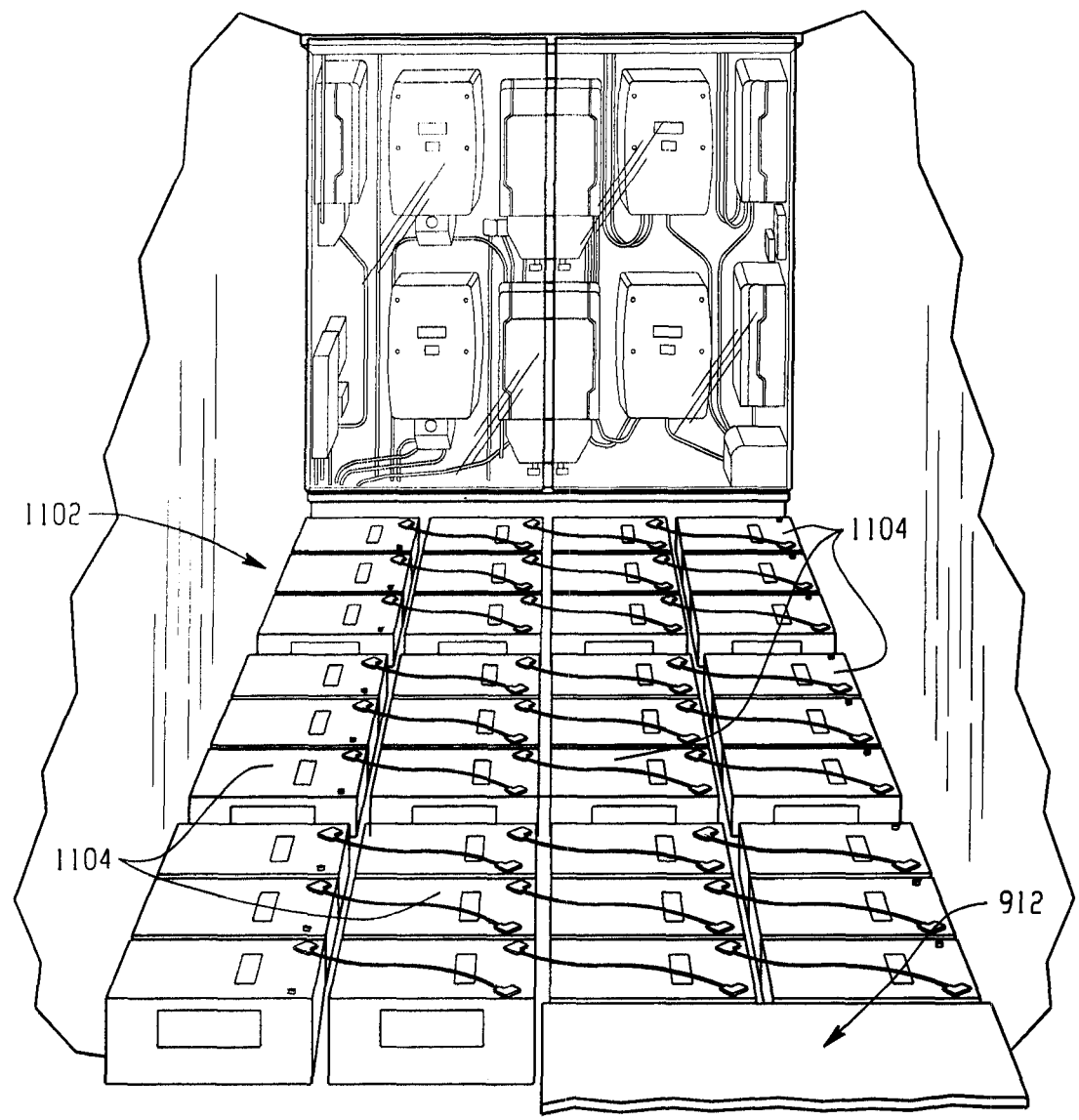
FIGS. 11 and 12 are perspective views of an exemplary embodiment of the false floor and the third section of the housing of FIG. 9, the Figs. further illustrate the battery array in the third section.

As mentioned above, the floor 912 is a false floor and defines the third region 1100. As shown in FIG. 9, the third region 1100 extends the complete length of the housing 110 and can be disposed beneath the electronics room 900. The false floor 912 is illustrated in FIG. 11. In this particular embodiment of the false floor 912, the false floor comprises a plurality of individually removable panels 922. A frame structure, individual stanchions, or the like (not shown) can be used to support the removable panels 922 and form the elevated false floor 912. The false floor 912 can be formed of any material capable of supporting the weight of the components used and/or stored above it. Exemplary materials will be those having the strength to support the system components, frame 916, persons operating inside the housing, and the like, while be light enough for a person to lift one of the removable panels if necessary to view the third section 1100. For example, the false floor 912 can be formed of a plurality of individually removable fiberglass panels 922.

Figure 12:
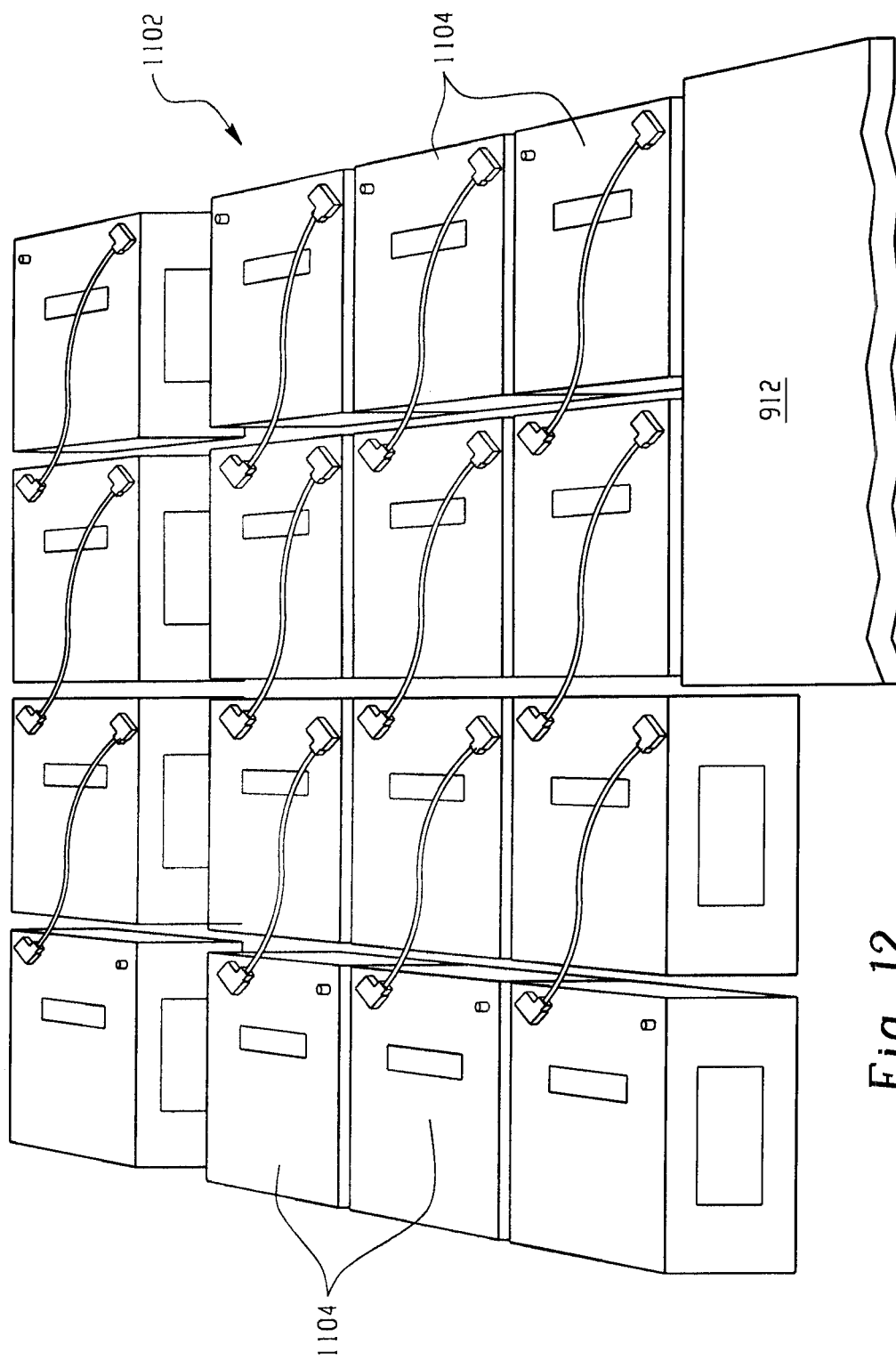

In one embodiment, the third region 1100 is sized and utilized for storage of the tower assembly (or lattice frame) of the wind powered generating device 300. The tower sections are specifically sized so that they can be stored in the third region (compartment) 1100. In another embodiment, the third region 1100 is sized and utilized for storage and operation of the batteries configured to store the power generated by the various power generation devices. FIGS. 11 and 12 illustrate an exemplary embodiment of a battery array 1102 disposed beneath the false floor 912 in the third section 1100. The batteries 1104 are anchored beneath the false floor 912 so that they do not move during transport of the housing 110. The batteries 1104 are in electrical communication with the electronic equipment in the room 900 and are configured to store power generated by the power generating devices when all of the generated power is not immediately being used by outside sources. The battery array 1102 represents an efficient use of space that aids in maximizing the component storage for the housing 110 and, therefore, the possible maximum power output for the mobile power system 100.

The housing 110 as described above, and the individual sections therein (i.e., 900, 1000, 1100) are important in the organization of the both the stored/transportable system and the deployed/operational system. By providing an planned, ordered, and arranged system of packing, storing, and removing system components, the space of the housing 110 is used to maximum efficiency and the setup time for the system is greatly reduced. In one embodiment, the mobile power system 100 can be removed (i.e., unpacked) from the housing 110 and the system assembled and ready for operation in eight hours or less, specifically four hours or less by operators trained in assembly of the mobile power system 100.

Figure 13:
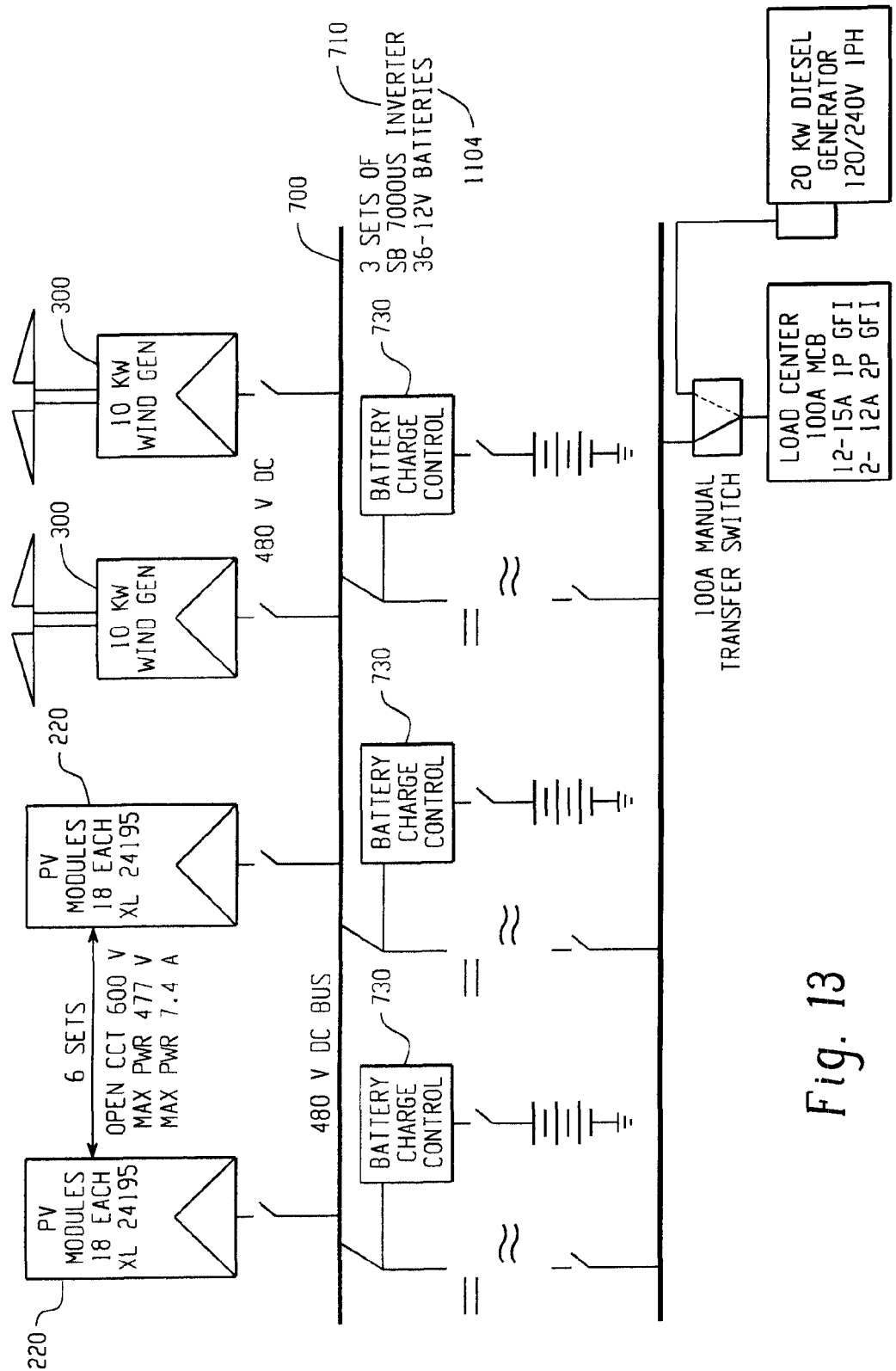
FIG. 13 is a schematic showing an exemplary arrangement of components of the mobile power system of FIG. 1.

In one embodiment and as shown in the schematics of FIGS. 1 and 13, the various energy sources and other electrical equipment are electrically connected via a common bus 700 (busbar). A busbar in an electrical power distribution, such as the mobile power system 100, refers to thick strips of metal (e.g., copper or aluminum) that conduct electricity within a switchboard, distribution board, substation or other electrical apparatus. The busbar is either an AC or DC busbar depending upon the type of current being used in a given application. Busbars can be connected to each other and to an electrical apparatus by bolted or clamp connections.

In one embodiment, as illustrated, the mobile power system 100 includes a DC coupling arrangement including a DC bus 700. The use of a DC coupling scheme greatly simplifies system expansion, extends the life of batteries, and increases the overall efficiency of daytime power usage. One of the most important factors in an off-grid system design, such as an off-grid photovoltaic system design according to the present invention, is the ability for the system to be added onto in the future. In other words, how easily can the system be expanded to accommodate increases in demand for power. DC coupling (or AC coupling for that matter) provides an elegant solution to this issue by allowing all of the power generating devices to be connected to the system via a common DC bus. As the demand for power increases, new sources of power can be installed and connected to the DC bus, thereby instantly increasing the overall capacity of the system.

Generally speaking, the interior compartment of the housing 110 can store the exterior and interior components of the mobile power system 100 during transport of the system 100. Interior components of the mobile power system 100 can include, for example, electronics and telecommunications equipment, designed to, among other things, receive, store and convert the power receiving within the housing 110 from the solar and wind powered generating devices 200, 300 or other power supplying devices. Such equipment can include a combiner box for combining the power received within the housing 110, one or more inverters for converting the various forms of direct current receiving within the housing 110 to various forms of alternating current, one or more batteries for storing direct current received within the housing 110, and one or more backup power units or equipment, such as a diesel fuel driven generator, etc. It will be appreciated that the backup power unit(s) can be located outside of the interior compartment of the housing 110 and instead be electrically coupled to the housing 110 using conventional techniques. The electronics equipment can allow for the mobile power system 100 to distribute power in a plurality of electrical configurations such as a plurality of different voltages of alternating current and a plurality of different voltage of direct current.

In terms of the overall power generation and storage scheme, the mobile power system includes a number of electrical components to process and store the energy harnessed by the alternative energy devices. For example, in the embodiment shown in FIG. 1, there are six sets of photovoltaic devices 220 with each set containing 18 individual photovoltaic devices (modules) 220. As shown in FIG. 13, the sets of photovoltaic devices 220 are electrically connected to the bus 700 which can be in the form of a 480 V DC bus. In one embodiment, this arrangement of photovoltaic devices 220 generates a maximum power of about 477 V (Max power 7.4 A); however, this is merely one exemplary arrangement and other outputs can be realized by equipment selection or modification.

Figure 14:
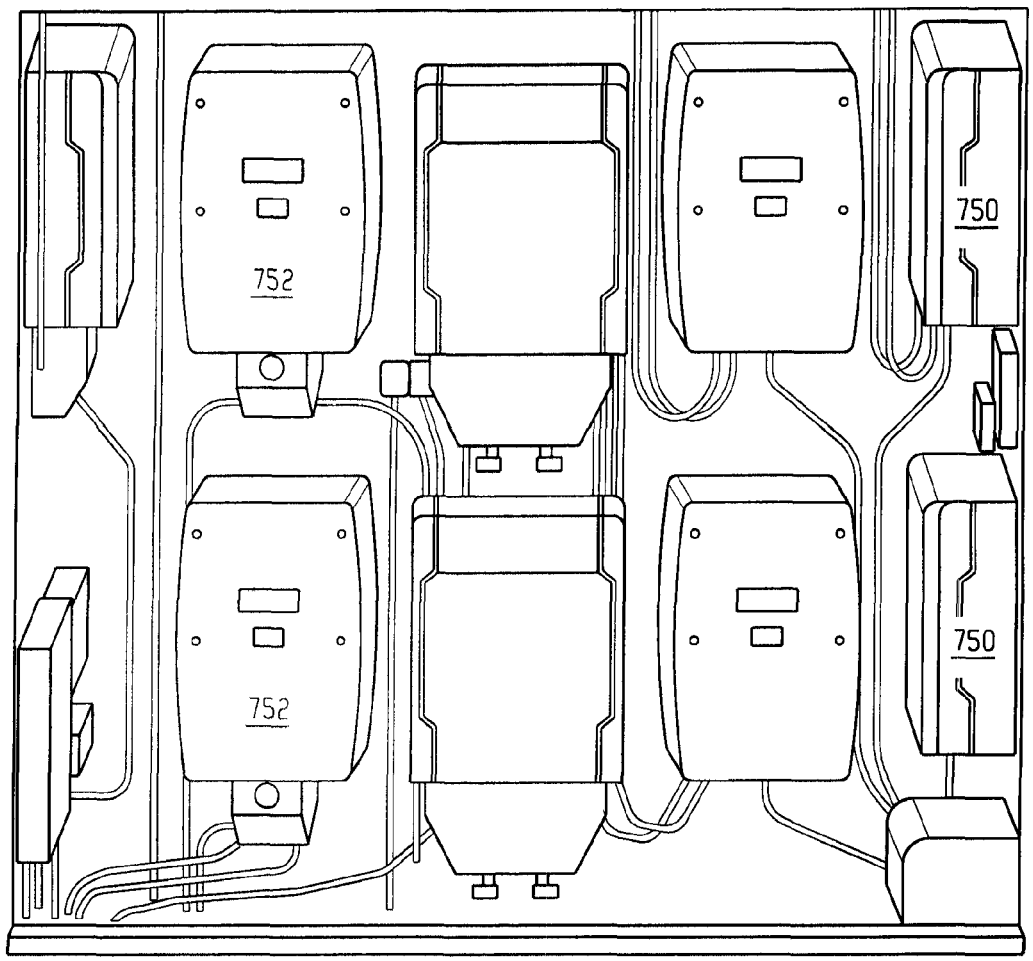
FIG. 14 is a perspective view of an exemplary embodiment of the electrical components disposed in the first section of the housing of FIG. 9.

In the illustrated embodiment, there are a number of inverters 710 that are contained within the housing 110 for converting the various forms of direct current received within the housing 110 to various forms of alternating current. For example, the system 100 includes a number of solar inverters for converting the direct current received from the solar powered generating devices and similarly, the system 100 includes a number of wind inverters for converting the direct current received from the wind powered generating devices. There are any number of different commercial inverters can are suitable for use in the present invention. For example, one type of solar inverter is a Sunny Boy 7000 solar inverter from SMA Solar Technology. The Sunny Boy 7000 solar inverter is configured such that the input is DC power (from the photovoltaic panels), while the output is AC power. Similarly, one type of wind inverter is a Windy Boy wind inverter from SMA Solar Technology. The Windy Boy wind inverter is configured such that the input is DC power (from the wind turbine), while the output is AC power. It will be appreciated that other inverter models from SMA Solar Technology can be used and moreover, inverters from other companies can equally be used. In another embodiment, as shown in FIG. 1, there are seven sets of photovoltaic devices 220 with each set containing 24 individual photovoltaic devices (modules) 220. Each of the sets of photovoltaic devices 220 are electrically connected to a power inverter 750. Exemplary power inverters 750 can include, for example, Sunny Boy Series 5000US, 6000US, 7000US, or 8000US series inverters commercially available from SMA America®. FIG. 14 illustrates the use of Sunny Boy 6000US series power inverters disposed in the first section 900 of the housing 110. The system further comprises four inverters 752 in electrical communication with the main distribution panel 754, the battery array 1102, and the like. The inverters 752 are configured to control the flow of generated power, such as to the batteries, a power load, or the like. Exemplary inverters 752 can include, for example, Sunny Island Series 5048US or 4248US series inverters commercially available from SMA America®

In addition to the use of inverters, a predetermined number of batteries 1104 are used for storing the direct current received within the housing 110 from the various alternative energy sources, e.g., the solar powered generating device 200 and the wind powered generating device 300, etc. Any number of different types of batteries can be used from a wide number of commercial sources. In one embodiment, the batteries are 12V batteries (e.g., batteries from MK Battery of Anaheim, Calif.). The batteries 1104 can be arranged in any number of different ways with respect to the alternative energy sources. For example, there is a bank of batteries associated with the solar powered generating device 200 and there is a bank of batteries associated with the wind powered generating device 300. Additional associated equipment, such as battery charge controls 730, can be utilized as shown in FIG. 13.

As described below in connection with FIG. 15, the mobile power system 100 can provide a power interface by means of an external control panel 800 allowing for connection of a variety of load devices requiring different electrical configurations. For example, load devices requiring direct current, 120 volt alternating current and/or 230 volt alternating current. Additional components housing within the interior compartment 140 can include other electronic devices, such as charge controllers, telecommunications system, such as wireless communications equipment, cooling systems, such as fans to cool the equipment, as described herein, computer systems, etc.

Figure 15:
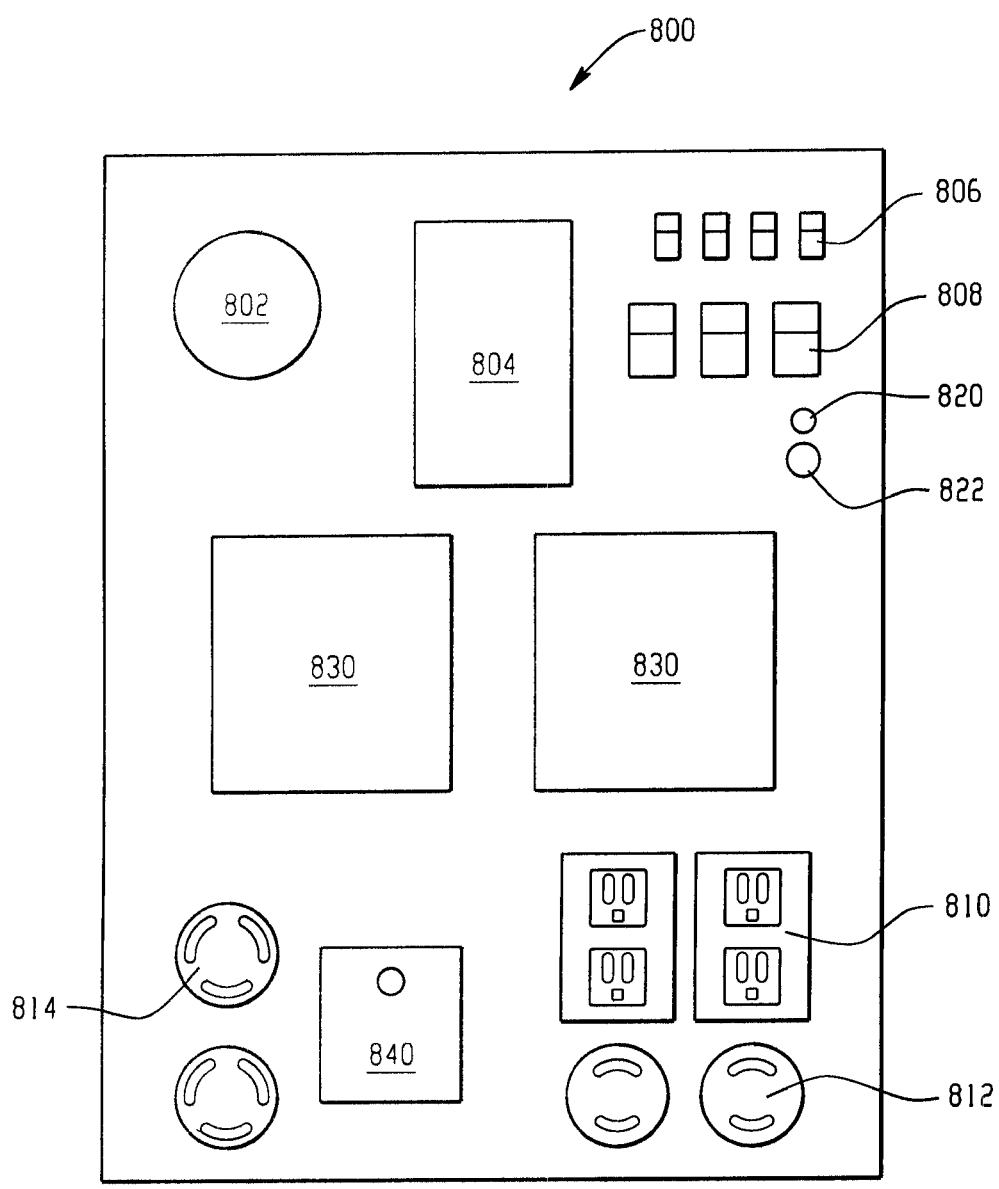
FIG. 15 illustrates a control panel of the mobile power system according to an embodiment of the present disclosure

FIG. 15 illustrates one exemplary exterior control panel 800 that can be a part of the mobile power system 100. The control panel 800 can be installed within a complementary shaped openings that is formed in the housing 100 (e.g., in a side or end wall thereof) prior to delivery of the system 100 to the in-field site. It will be appreciated that the control panel 800 can be installed in the housing 110 after the system is delivered to the site and in such case, during transportation a weather proof cover of the like is used to protect the opening. It will also be appreciated that even after installation in the housing 110, the control panel 800 can be protected by means of a shield or the like that protects the control panel 800 against the weather.

The control panel 800 can include, for example, a vent 802 for ventilation of the interior compartment 140, a telecommunications interface 804, one or more input connectors 806 for the solar powered generating devices 220, one or more; input connectors 808 for the wind powered generating devices 300, one or more AC load output connectors 810 for supplying 120 VAC, one or more AC load output connectors 812 for supplying 240 VAC, and one or more AC inputs 814 for receiving 240 VAC from the backup power source, in this case, the diesel fuel generator. The control panel 800 can include one or more coax cable connections 820 for receiving and sending, among other things, cable TV signals, one or more antennae input or output connections 822, one or more circuit breaker panels 830 having appropriate circuit breakers for the mobile power system 100, and one or more grid tie interfaces 840.

Figure 16:
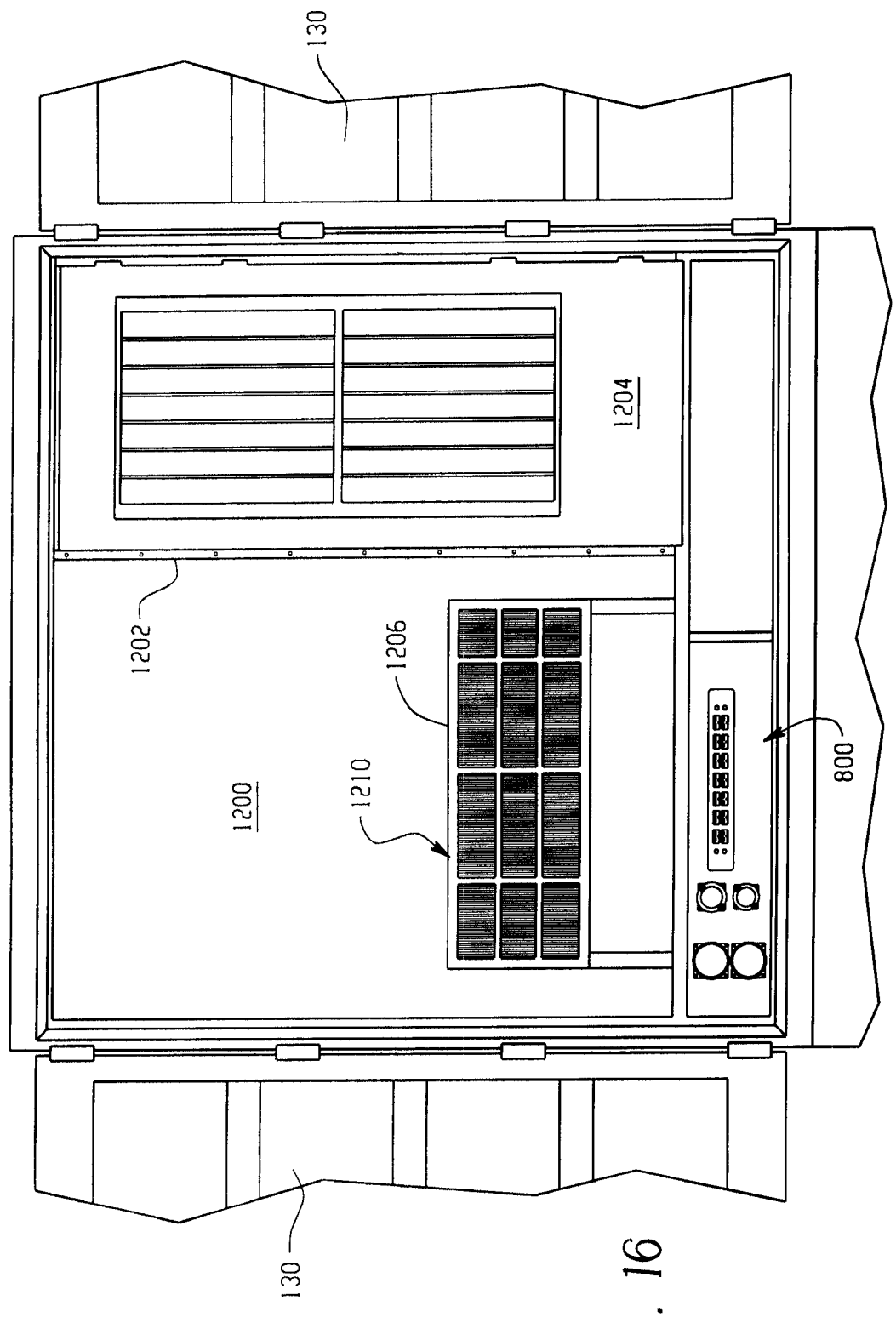
FIG. 16 is a perspective view of an exemplary embodiment of a bulkhead wall disposed in a first end of the housing of FIG. 9.
Figure 17:
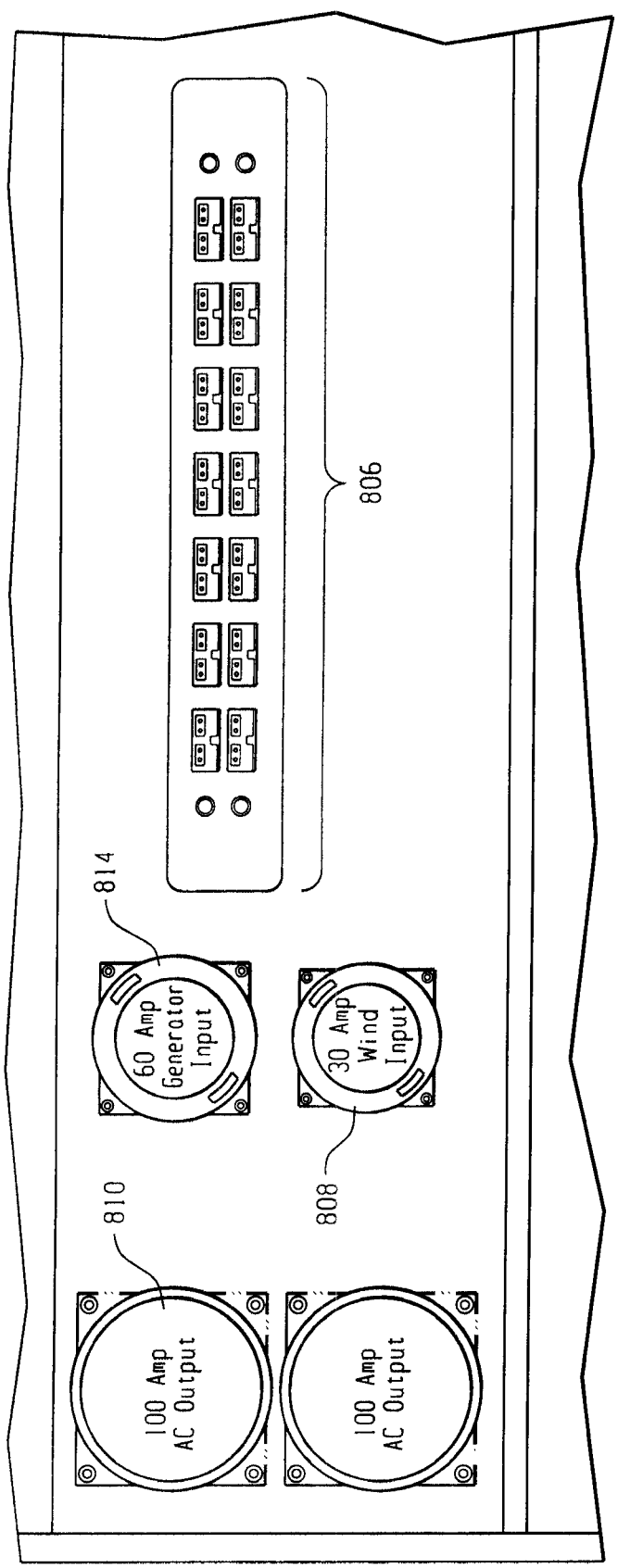
FIG. 17 is a close-up perspective view of the bulkhead wall of FIG. 16 showing an exemplary embodiment of the control panel disposed therein.

In another exemplary embodiment, in keeping with the theme of having no holes in the housing 110, the control panel 800 can be disposed in a bulkhead wall 1200. As shown in FIG. 16, the bulkhead wall 1200 is disposed in the opening 122 at the first end 112 of the housing 110. The bulkhead wall 1200 can be disposed in a position such that the housing doors 130 can be closed and locked with the bulkhead wall 1200 in place. The bulkhead wall can comprise any material suitable for providing an interior wall within the opening 122 of the housing 110. In one embodiment, the bulkhead wall 1200 may be formed of an aluminum material for its lightweight strength and versatility. The bulkhead wall 1200 is removable so that during setup of the mobile power system 100 the wall 1200 can be removed and the components to be deployed outside the housing, such as the solar panels 220, can be removed from the housing 110. The bulkhead wall 1200 includes a first opening 1202 configured for an access door 1204. The door 1204 provides access into and out of the housing interior, which is important after setup of the system 100 for monitoring of the electrical components, batteries, and the like operating within the housing during use of the system. The bulkhead wall 1200 further includes a second opening 1206 configured to accommodate a cooling vent/unit 1210. The cooling vent/unit 1210, as described above, is configured to regulate the temperature within the housing 110 and, thereby, protect the electronic components that can be sensitive to extreme temperatures. During transport or for any reason the housing doors 130 need to be closed, the cooling unit 120 can be removed from the second opening 1206, as the unit may extend beyond the bulkhead wall 1200 exterior. As mentioned, the bulkhead wall 1200 can further include the control panel 800. FIG. 17 illustrates the control panel 800 disposed in the bulkhead wall 1200. In this embodiment, the control panel 800 includes input connectors 806 for the solar powered generating devices 220, an input connector 808 for the wind powered generating device 300, two AC load output connectors 810 for supplying 120 VAC, and an AC input 814 for receiving 240 VAC from the backup power source, in this case, the diesel fuel generator. It is understood that other embodiments of the control panel 800 can include any number of other inputs and outputs, such as, without limitation, one or more coax cable connections for receiving and sending, among other things, cable TV signals, one or more antennae input or output connections, one or more circuit breaker panels having appropriate circuit breakers for the mobile power system 100, telecommunications interfaces, one or more grid tie interfaces, and the like.

Hereinafter, additional example embodiments including broadband agnostic terminals are described with reference to FIG. 18.

Figure 18:
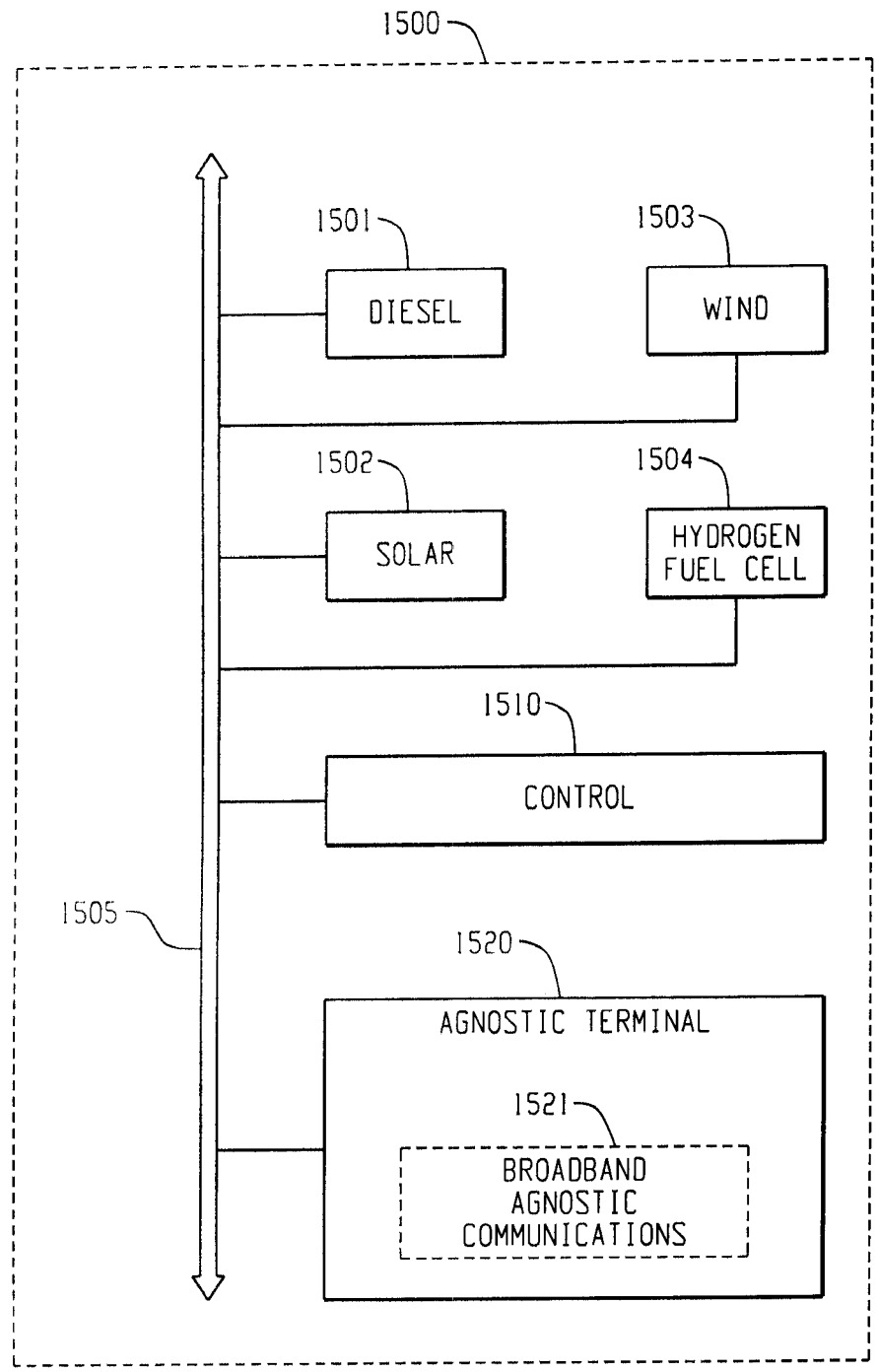
FIG. 18 illustrates a mobile power system overview, according to an example embodiment.

The mobile power system 1500 of FIG. 18 may include a plurality of alternative power sources 1501-1504. The alternative power sources are described in detail above, and thus exhaustive description is omitted herein for the sake of brevity. The mobile power system 1500 may further include control(s) 1510 disposed to control, monitor, regulate, and/or perform any other suitable function with regards to the alternative power systems 1501-1504. For example, the control(s) 1510 may be in communication with the alternative power sources 1501-1504 through communication medium 1505. The communication medium 1501 may be any suitable communication medium or combination medium effectively establishing and/or maintaining communication between control(s) 1510 and the alternative power sources 1501-1504.

The mobile power system 1500 further includes the agnostic terminal 1520 in communication with other components of the mobile power system 1500 over communication medium 1505. The agnostic terminal 1520 may include broadband agnostic communications 1521, and therefore the agnostic terminal 1520 may be a broadband agnostic terminal. Therefore, the broadband agnostic terminal 1520 may be in communication with a control unit(s) and/or other suitable portions of a mobile power system, including external systems and/or units over a variety of communication mediums, either concurrently or through seamless switching.

The broadband agnostic terminal 1520 may be a terminal configured to establish communication over different types of broadband and/or communication mediums (e.g., 1521). The broadband agnostic terminal 1520 may be secured within the housing 110 (e.g., within the electronics room 900), or on/within any suitable portion or location in the vicinity of the power system 100.

The broadband agnostic terminal 1520 may be configured to establish communication over a plurality of different communications mediums simultaneously, sequentially, in parallel, or in any other suitable manner. The communication mediums may include, but are not limited to, BGAN, KU Band, CDMA, GSM, IDEN, UMTS, LTE, GSMR, UHF, VHF, HF, any military defined radio access technology, and/or any other suitable medium. The broadband agnostic terminal 1520 may also be configured to establish and maintain IP sessions via indigenous noted network topology available in the vicinity of a deployed mobile power system. For example, the broadband agnostic terminal 1520 may be "patched" in or connected to an existing public switched telephony network, wide area network, local area network, and/or other suitable network to establish communications across the globe over the Internet. In another example, the broadband agnostic terminal 1520 may use data services or access from a cellular telephone or cellular adapted computer to establish communications. In yet another example, the broadband agnostic terminal 1520 may use a satellite link(s) to establish communications. The broadband agnostic terminal 1520 may also include wireless (e.g., 802.11 A/B/G/N ad hoc hotspot) capability for wireless access on site or within the vicinity of the mobile power system such that other devices external to the mobile power system may access data services through the broadband agnostic terminal 1520. It follows that any suitable communications medium or combination thereof may be applicable to example embodiments, and thus example embodiments should not be limited to only the examples discussed above, but should include all available and/or applicable technologies suitable to any particular application of an example embodiment.

The broadband agnostic terminal 1520 may be further in communication with periphery, portions, or the entirety of the mobile power system 100 over IP, Serial, Form C contact closure, and/or any other communication layer 1 connectivity from the infrastructure/mobile power system periphery to the broadband agnostic terminal 1520 (e.g., 1505). Each portion of the mobile power system may provide statistics to the broadband agnostic terminal 1520 such that the statistics may be transmitted through the broadband agnostic terminal 1520.

The broadband agnostic terminal 1520 may utilize load balancing, user defined "Least Cost Routing", and/or other suitable methodologies to enable "best fit" technology with single or multiple blades (in an accretive manner) to establish and maintain redundant communications between any monitoring station (i.e., in communication over a, or a combination of, communication mediums described herein) and the mobile power system.

This communication link may be periodical, "always on", or any combination thereof, and may allow the mobile power system to transmit and receive constant communication message traffic from the native monitoring station (e.g., back office) in an agnostic fashion. The agnostic backhaul features described above allow the "health status", "health functions", and/or statistics of a mobile power system to be proactively monitored by a user-defined TSOC or NOC.

Example health statistics/functions such as Electrical Control Room Door Open, DC power level, AC power level, Battery status, Temp, Self Check, Amperage draw, THD, power remaining (watts, and amps), wind status check, solar status check, histograms of all above, as well as future as user-defined metrics are available via the broadband agnostic terminal 1520.

Furthermore, the broadband agnostic terminal 1520 may include, or alternatively be in communication with, GPS enabled chipset/antennae that may stamp message traffic with TOD (Time of Day) as well as current Lat/Long or finer/coarser geographic location data. The broadband agnostic terminal 1520 may be powered through the power generated at the mobile power system, and may also have associated antennas mounted accordingly.

It is also noted, that in accordance to rugged example embodiments described above, the broadband agnostic terminal 1520 may be disposed to remain operational in a variety of harsh environments. For example, the broadband agnostic terminal 1520 may be configured to remain in a stable operational state throughout the AREMA temp spec or greater, or according to any desired specifications.

Hereinafter, additional example embodiments of mobile power systems for telecommunications systems are described in detail with reference to FIG. 25.

Figure 19:
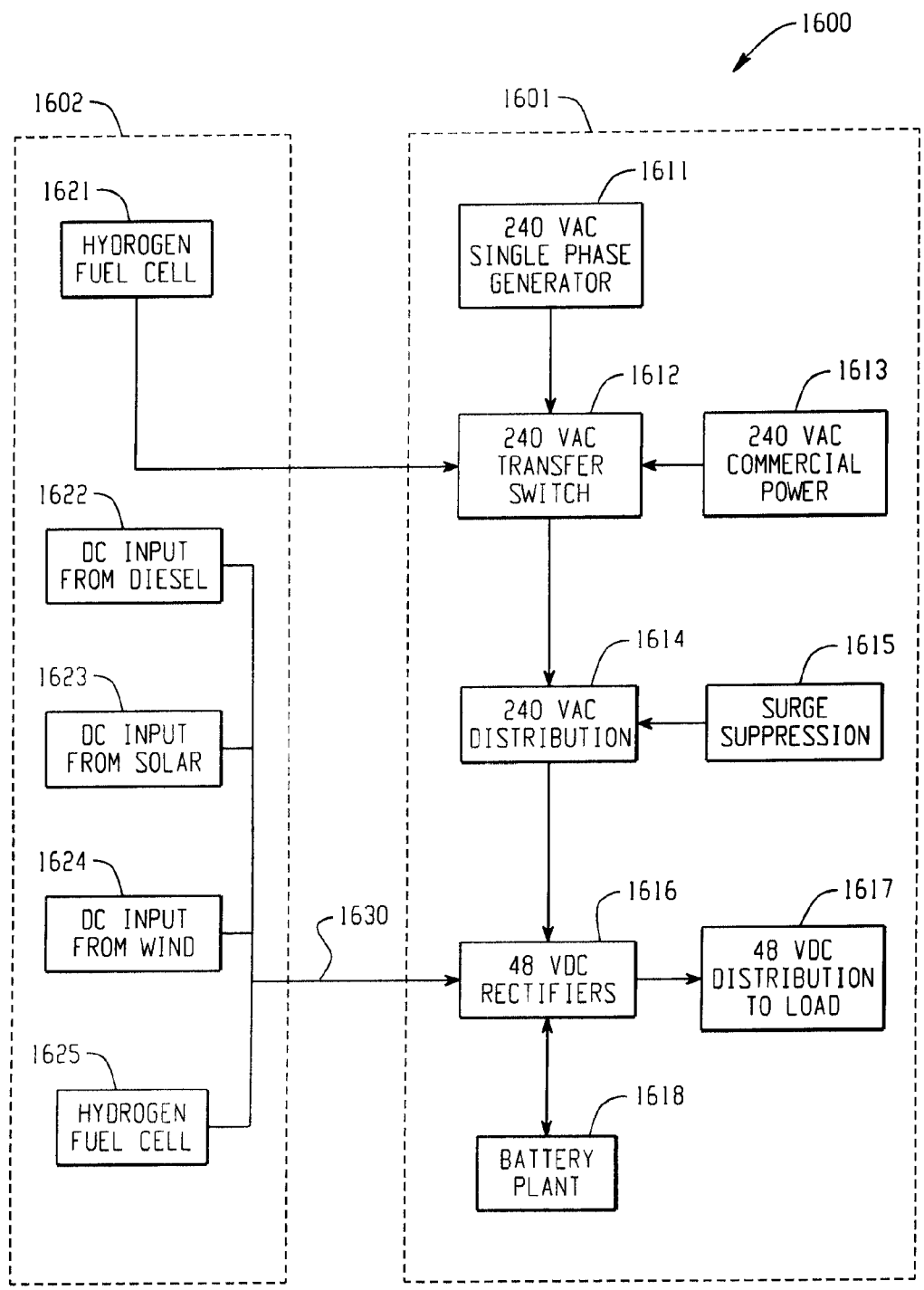
FIG. 19 illustrates a mobile telecommunications power system overview, according to an example embodiment.

With regards to FIG. 19, it is noted that the mobile power system 1600 (1) includes Commercial AC input (240 VAC Single Phase) as option; (2) may have Load floated through battery plant at all times; (3) May have environmental conditioning powered off of 240 VAC or 48 VDC Bus; (4) may have Battery plant of rated KW with suitable SOC (state of charge); and, (5) said TVSS is fed off of 240 VAC leg for protection (Transient Voltage Surge Suppression).

Turning back to FIG. 19, a legacy public switched telephony network (PSTN) 1601 may be in communication with a mobile power system 1602. The mobile power system 1602 is described in detail above with regards to multiple example embodiments, and thus further exhaustive description is omitted herein for the sake of brevity.

The legacy PSTN 1601 may include a 240 VAC single or multi-phase generator 1611 in communication with a 240 VAC transfer switch 1612. The 240 VAC transfer switch 1612 may receive power from a commercial power source 1613, a hydrogen fuel cell 1621 of the mobile power system 1602, or any combination thereof. For example, the hydrogen fuel cell 1621 may be considered an alternative or backup power source, or a primary source. Similarly, the commercial power source 1613 may also be considered either a primary or backup power source, depending upon any desired application.

The PSTN 1601 may further include 240 VAC distribution 1614 in communication with the 240 VAC transfer switch 1612. The 240 VAC distribution 1614 may be in communication with surge suppression system 1615 such that transients or surges are reduced.

The PSTN 1601 may further include 48 VDC rectifiers 1616 receiving AC power from the 240 VAC distribution 1614. The 48 VDC rectifiers 1616 may receive battery backup from battery plant 1618. The battery plant 1618 may also receive power from the 48 VDC rectifiers, such that an effective battery backup system is provided within the PSTN 1601. Furthermore, the 48 VDC rectifiers 1616 may provide 48 VDC to 48 VDC distribution 1617 for distribution within the PSTN 1601.

According to the arrangement 1600, the PSTN 1601 may receive power from mobile power system 1602 over medium 1630. The medium 1630 may be disposed to provide relatively well conditioned power, for example with less than five percent (5%) total harmonic distortion (THD). Power conditioning may be introduced through the medium 1630, or through/within the mobile power system 1602.

Furthermore, and as described in detail above, the mobile power system 1602 may include a plurality of alternative energy sources 1622-1625. Alternative power sources are described in detail above with regards to multiple example embodiments and thus exhaustive description is omitted herein for the sake of brevity.

Hereinafter detailed description of data and power connections to PSTN is provided below.

The PSTN is embodied in the hierarchy of the telephone company. In terms of obtaining access to the PSTN, a Local Exchange Carrier or LEC provider is necessary to provide a connection via a pair of wires or a local loop to connect the end user or subscriber to the public telephone network. In today's deregulated telecommunications environment, a Competitive Local Exchange or CLEC may also provide access to the PSTN. The requirements of the end user or subscriber will help determine the type of connection or local loop needed from the LEC or CLEC local access provider.

POTS service is the most basic wired connection type offered for access into the public telephone network This type of connection consists of twisted pairs of copper cable that connect an end user customer to the public network. This service is primarily used for switched voice services along with dial-up modem connections for data services. A standard RJ-11 type jack is the interface provided for connecting the customer equipment to the circuit.

DSL (Digital Subscriber Line) service provides high speed digital modem technology via a conventional telephone line using signal frequencies above those used for voice or fax so that the DSL signal does not interfere with voice or fax conversations. The DSL service provides a traditional POTS type voice connection along with Broadband internet access.

A DSL line is delivered to the customer on the same type of copper cable pairs as POTS service with a standard RJ-11 type jack as the interface. A DSL modem is required to provide broadband internet access. The DSL modem is connected to the circuit via the RJ-11 jack interface. An Ethernet connection is provided via the DSL modem with an RJ-45 type jack interface.

A T1 line is a dedicated connection consisting of 24 individual 64 Kbps channels each of which can be configured to carry voice or data traffic. Telephone companies typically allow customers to lease a fraction of the line known as fractional T1 Access. A standard RJ-45 type jack is the interface provided for connecting the customer equipment to the circuit.

LEC and CLEC companies provide T-1, Fractional T-1, and T-3 service as access links into carrier networks. For delivering multiple T-1 or Fractional T-1 circuits to a customer, it may prove more economical to the provider to serve an area with fiber and then drop out individual circuits rather than deploying multiple circuits on copper cable pairs. When delivering T-1 or Fractional T-1 connections, a demarcation panel or NIU device with RJ-45 type jack interface is installed as the hand off to the customer.

For T-3 type circuits, a LEC maintained fiber optic system is deployed to deliver the circuit to the customer. Coaxial cables with BNC type jacks comprise the physical connection to the end user equipment for T-3 circuits.

For access to the PSTN, these connections must be channelized at both the LEC Central Office and at the customer premise. Data applications may use either a portion of or the entire bandwidth of the circuit. For private line connections, in addition to T-1, Fractional T-1, and T-3 rates, several SONET level bandwidth capacities are available to end user customers.

Optical interfaces are typically delivered to end user customers with either single mode fiber optic cable with 1310 nm wavelength or may also be configured to connect with multi-mode fiber with 850 nm wavelength. Standard connector types include SC and FC type. The end user customer must have applicable CPE equipment capable of connecting to OCn level connections.

For data applications and increasingly for IP voice, Ethernet access is available in metro areas. End user customers are able to utilize Ethernet bandwidth to build private networks connecting remote offices and are also able to utilize Ethernet access for IP voice applications. SIP trunking allows IP voice to connect to the PSTN. To successfully deploy SIP trunking, an end user must utilize an IP enabled PBX with SIP enabled trunk side, an enterprise edge device understanding SIP, and an internet telephony or SIP trunking service provider.

Ethernet bandwidth may be delivered to the end user at 10/100 BaseT up to 1 Gig bps ports. Customers that require higher bandwidth may also obtain services up to 10 Gig bps. At these higher bandwidth speeds, the connection type to the customer is fiber optic cable with the connector type determined on an individual case basis.

In telephony, the demarcation point is the point at which the telephone company network ends and connects with the wiring at the customer premises. A demarcation point is also referred to as the demarc, DMARC, MPOE (minimum point of entry or main point of entry). The demarcation point varies between countries and has changed over time.

The modern demarcation point is the network interface device (NID). The NID is the telco's property. The NID may be outdoors (typically, mounted on the building exterior in a weatherproof box) or indoors.

The NID is usually placed for easy access by a technician. It also contains a lightning arrestor, fuse and test circuitry which allows the carrier to remotely test whether a wiring fault lies in the customer premises or in the carrier wiring, without requiring a technician at the premises. The demarcation point has a user accessible RJ-11 jack (a "test jack" or "demarcation jack"), which is connected directly to the telephone network, and a small loop of telephone cord connecting to the jack by a modular connector. When the loop is disconnected, the on-premises wiring is isolated from the telephone network and the customer may directly connect a telephone to the network via the jack to assist in determining the location of a wiring fault. In most cases, everything from the central office to and including the demarcation point is owned by the carrier and everything past it is owned by the property owner.

As the local loop becomes upgraded, with fiber optic and coaxial cable technologies sometimes replacing the original unshielded twisted pair to the premises, the demarcation point has grown to incorporate the equipment necessary to interface the original premises POTS wiring and equipment to the new communication channel.

Electronics, agnostic terminals, and/or control equipment of mobile power systems described above may be disposed to communicate with PSTN over any suitable connection including, but not limited to, those described above. Furthermore, standard interface components of a PSTN including power termination components may be in communication with, or arranged to communicate and receive power from mobile power systems, for example as described with reference to FIG. 19.

Therefore, as described above, mobile power systems according to the example embodiments provided herein may be configured and disposed to provide power to existing PSTN, new PSTN, or any combination thereof. The mobile power systems may be configured to provide relatively well conditioned power over a medium which may provide standardized DC voltages to the PSTN. The standardized DC voltages may be a single voltage (e.g., 48 VDC) or a plurality of voltages such as in a "wide bus" (e.g., 48 VDC, 12 VDC, and 5 VDC, etc). These voltages may be provided before or after a 48 VDC distribution of the PSTN.

Hereinafter, a more detailed description of housings of example embodiments is provided.

As used in this description, "housing" is a receptacle or container for the storage, use, and/or transportation of the various mobile power system components described in detail above. The housing of the mobile power system can be any structure configured to contain the mobile power system components while being freely mobile using standard transportation practices. The housing can have any size and shape appropriate for the intended mode of transportation to deliver the mobile power system to the desired location. Likewise, the housing can be formed of a material or materials capable of protecting the mobile power system during transport while also meeting any weight limitations required by the mode of transportation. Generally, the housing will be formed of metal, such as steel or aluminum, but in some embodiments the housing can be a lighter weight material, such as a composite. Moreover, the mobile power system described herein can be contained in a single housing or can occupy a plurality of housings. Several factors can determine the number of housings required to contain the mobile power system such as, without limitation, the intended mode of transportation for the system and the amount and size of the system components to be transported (e.g., the number of solar panels desired).

Another advantage of the mobile power system 100 as described herein, particularly in relation to the housing 110, is that none of the exterior system components need be in physical communication with the housing when the system is assembled and in operation. In particular, none of the alternative energy power generating components are coupled to the housing. Rather, the system components are merely in electrical communication with the components of the system that remain and operate within the housing. This provides a flexible footprint for the mobile power system in operation, such that the exterior components are disposed in strategic locations remote from the housing. Such strategic locations can be based upon a variety of factors, for example, topography, altitude, ultraviolet exposure, wind exposure, vulnerability to attack, and the like.

The transportable housings as described herein satisfy international and military standards and regulations regarding portability and stackability, including ISO, Container Safety Convention (CSC), Coast Guard Certification (CGC), and Military standards (MIL-SPECS, such as MIL-STD-810, MIL-STD-2073, and the like). For example, and illustrated by the housing 110 of FIG. 1, the housing can be a standard size, shape, and weight freight or shipping container meeting ISO guidelines. Generally, an ISO container is a standardized metallic enclosed structure having a floor, a roof, four walls and at least one door all with specified dimensions and design attributes. Common standard dimensions of ISO containers include, but are not limited to, length dimensions of 20, 40, 45, 48, and 53 feet, a width dimension of 8 feet, and height dimensions of 8.5 feet and 9.5 feet. The containers typically have four standard, factory installed, corner fittings on the upper surface of the container roof to lift and position the containers during transport. In the embodiment of FIG. 1, the housing 110 is an ISO container having a length (L) of approximately 40 feet.

Using a standard ISO freight container as the housing 110 of the mobile power system 100 provides many benefits. For example, using a standard ISO freight container provides access to the numerous worldwide transportation systems that are designed to facilitate movement of such standard containers throughout the world. Once the freight container reaches a port or the like, it can then be moved to the in-field site using conventional transportation, such as a truck that is configured to receive and carry the freight container to the site. The use of a standard ISO freight container for the housing 110 provides a sturdy, protective structure for the storage of the interior and exterior components of the mobile power system 100 during transportation. In addition, the housing 110 protects interior components (electronic equipment) from the environment once the system 100 reaches its intended location and is assembled in the field. Further, the size and weight of the standard ISO freight container protects against unintended movement of the housing 110 be it by weather forces or human intervention. The freight container 110 also provides a robust structure that is difficult to vandalize and theft of the interior components is difficult since the doors of the container 110 can be sealed and locked.

To transport the mobile power system 100, the ISO specified housing 110 of FIG. 1 can be properly and securely loaded with the desired system components and the housing then closed and locked and/or sealed for transport. The housing 110 can then be placed aboard any form of transportation suitable for ISO containers. Exemplary modes of transportation for ISO containers can include, without limitation, trains, trucks, ships, aircraft, such as fixed wing cargo planes, and the like. In many cases, in order for the mobile power system 100 to reach its desired destination, the housing 110 may have to be moved from one mode of transportation to another. For example, the mobile power system 100 may first be loaded upon a cargo ship. Upon the ship reaching its port of destination, the housing 110 can be lifted from the cargo ship and placed upon, for example, a truck trailer for delivery inland.

In order to take advantages of the numerous benefits that are accorded by using a standard ISO freight container as the housing 110 of the mobile power assembly 100, it will be appreciated that the container should be designed to allow for rapid assembly and disassembly of the exterior components to and from the housing 110, while not altering or modifying the housing 110 so that it no longer conforms to the appropriate standards for shipping (i.e., the ISO standards).

To reiterate, the housing used with the mobile power systems described herein can be any container, receptacle, shelter, or the like suitable for transporting the mobile power system by truck, ship, train, or air. Again, the ISO container labeled as housing 110 of FIG. 1 is shown for illustration purposes only. In other embodiments, it may not be practical for the mobile power system to be contained and transported in a standard ISO container. In such embodiments, other standardized containers can be used, such as ISU® containers or Mine Resistant Ambush Protected (MRAP) containers, or the containers can have a non-standardized, custom configuration suitable for the particular mobile hybrid power system packed therein. As noted above, the mobile power system is particularly useful in remote areas, such as villages with no traditional power grid and little-to-no infrastructure. Often, these remote villages are difficult to access due to rugged terrain and the like. Other useful applications for the mobile power system include, without limitation, military and counter-insurgency type applications. These applications can require deployment of the mobile power system in areas that are not only remote, rugged, and often uninhabited, but also may be susceptible to attack. As such, traditional means of transporting the housing may not be feasible, whether it be due to the difficult terrain over which the housing must be carried, or the potential hostile areas through which the housing must travel. For such deployment, it is necessary to use suitable forms of transportation to deliver the housing to its final destination, which may not include standard transportation, such as commercial trailer trucks. Examples of transportation modes for delivering the housing in these hostile and extreme conditions can include, without limitation, helicopters, all-terrain vehicles, and military transports, such as family of medium tactical vehicles (FMTV), family of light medium tactical vehicles (LMTV), heavy expanded military tactical trucks (HEMTT), and the like.

Delivery over such terrain and/or through such environments will generally require one or more housings designed for the dimension and weight limitations of the chosen transportation mode or modes. For example, delivery of the mobile power system to a mountainous region might require that each housing has a weight that enables a military truck to pull the housing load up steep grades. Similarly, it may be desirable to deliver the mobile power system to the mountainous region via air transport, such as by helicopter. In such an embodiment, the mobile power system components can be disposed in a plurality of housings configured to fit inside the helicopter cargo holds. Depending on the type of helicopter used, the mobile power system can be delivered in a single helicopter, multiple helicopters, or by multiple trips with the single helicopter. Because these types of uses for the mobile power system generally require smaller and or lighter housings, it will be advantageous to deploy the mobile power system in a plurality of housings. In one embodiment, for example, the mobile power system can be contained in two 20 feet length (L) containers configured to be carried on a military transport. In such an embodiment, the components of the mobile power system can be disposed within the two housings in any fashion suitable for including all the desired components within the two housings, while meeting predetermined weight limitations for each housing. For example, the first housing can contain solar power generating components and/or wind power generating components. The second housing can then contain the electronics, telecommunications, batteries, and the like to complete the mobile power system, as well as many additional solar panels or wind power generating devices as will fit in the second housing. Such a design will provide additional flexibility to the mobile power system, because more wind or solar power generating devices can be included as needed. In another embodiment, the mobile power system can be divided into four housings, wherein each housing comprises dimensions suitable for transport in a helicopter interior. Each of the housings can be the same size or they can be different. Similar to the embodiment described above, the mobile power system components can be divided and contained in the four housings by any means suitable for delivering the complete mobile power system. In an exemplary embodiment, it is desirable to divide the components within the four housings such that the system can be assembled in the most efficient manner, and the maximum amount of alternative power generating devices can be included.

With regard to transport of the housing or housings by helicopter, each housing can be configured to travel internally or externally with the helicopter. Some helicopters have internal cargo departments as well as the ability to carry loads externally, such as by sling. The housings described herein can be configured to travel with helicopters internally or externally, depending on, for example, helicopter internal cargo hold dimensions, helicopter internal payload ratings, helicopter external payload ratings, number of housings required for the mobile power system, and the required dimensions of the housing(s) for the particular mobile power system design. Exemplary helicopters for use in transporting the housing include, without limitation, cargo helicopters, utility helicopters, and cargo vertical helicopters. Examples of cargo helicopters include the CH-47 Chinook, CH-46E Sea Knight, CH-53 Sea Stallion, CH-53E and 53K Super Stallions, and the like. Examples of utility helicopters include the UH-1 Iroquois, UH-60A, C, L, and M Black Hawks, SH-60B, SH-60F, MH-60R, MH-60S, and HH-60H Sea Hawks, and the like. Examples of cargo vertical helicopters include the CV-22, V-22A, HV-22, SV-22, MV-22B, and CV-22B Ospreys, and the like. Each of these helicopters will have different internal cargo hold dimensions, internal weight capacities, external load weight capacities, and external load attachment capabilities. Examples of the variations in helicopter loading capabilities are shown in Table 1.

TABLE 1

| Aircraft | Internal Weight Capacity | Internal Dimensions | External Load Capacity | External Capability |
|---|---|---|---|---|
| CH-47 | 28,000 lbs. (12,700 kg) | 7 ft 5 in. W × 6 ft 5 in. × 30 ft 3 in. L | 26,000 lbs (11,793 kg) | Single Point & Dual Point |
| CH-53 | 32,000 lbs (14,515 kg) | 7 ft. 6 in. W × 6 ft 6 in. H × 30 ft. L | 36,000 lbs (16,329 kg) | Single Point & Dual Point |
| CH-46 | 8,000 lbs (3,628 kg) | 6 ft W × 6 ft H × 24 ft 2 in. L | 10,000 lbs. (4,535 kg) | Single Point |
| UH-60 | 2,640 lbs (1,197 kg) | 6 ft 6 in W × 5 ft 10 in × 19 ft 8 in L | 8,000 lbs (3,628 kg) | Single Point |

TABLE 1-continued

| Aircraft | Internal Weight Capacity | Internal Dimensions | External Load Capacity | External Capability |
|---|---|---|---|---|
| CV-22 | 15,000 lbs (6,803 kg) | 5 ft. 11 in. W × 6 ft H × 24 ft. 2 in. L | 15,000 lbs (6,803 kg) | Single Point & Dual Point |

The housing(s) as described herein can advantageously be designed to suit the limitations of the particular helicopter model intended for transport of the mobile power system. As such, the housing can be designed for internal load or external load. When designed for external helicopter load, the housing is configured to be able to support the dynamic load imposed by the lifting and slinging of the housing, which can be about three times the static load of the housing. Housings suitable for the above-described modes of transportation, including helicopter transportation, include containers commercially available from AAR Mobility Systems. Exemplary containers commercially available from AAR Mobility Systems include their Internal Aircraft/Helicopter Slingable (ISU®) series container units; specifically the 56000 ISU® series containers, such as the ISU® 60, ISU® 70, ISU® 80, and ISU® 90 containers. This nomenclature distinguishes the overall height of the container. For example, an ISU® 90 container has a 90-inch height. All of these container housings are transportable by many of the helicopter models described above, as well as air transportable by fixed wing aircraft, such as the C-130, C-141, C-5, C-17, KC-10, commercial aircraft, and the like. The 56000 ISU® series containers can be air lifted in the internal cargo holds of the helicopter or they can be externally lifted using a single-point or a dual-point rigging procedure. The type of helicopter transportation will depend, in part, on the model of helicopter used and size of the housings. As such, the 56000 ISU® series containers include one or more winching rings located at the lower corners of the housing and configured to provide attachment points with which to secure the containers during transport. Likewise, the 56000 ISU® series containers are helicopter sling certified, and as such, include attachment points located at least at the upper corners of the housing and configured for rigging one or more housings to a helicopter. Moreover, the 56000 ISU® series containers can also be 463L Certified for the military's pallet cargo system.

The mobile power system as described herein can advantageously be deployed in various terrains, environments, and situations by a wide variety of transportation means. Moreover, the mobile power system can be disposed in one or more housings during transport. An advantage of disposing the mobile power system components in more than one housing is that each housing can be smaller and lighter than the size of housing that would be required to contain the entire mobile power system. Moreover, additional housings can be added to the system as desired to increase the number of solar power generating devices, wind power generating devices, or the like, thereby increasing the potential power output of the mobile power system. Each of the housings for the mobile power system can be serially attached when deployed in the desired location, or the housings can be deployed remotely from one another, but in electrical communication therewith. Such deployment of the housings can be advantageous if the terrain is unsuitable for deployment of all the housings and system components in a single location. Also, for military application of the mobile power system, tactically spreading out the location of each housing (and the components therein)

prevents the entire mobile power system from being taken out in a single attack on one location. Moreover, as mentioned above, the components unpacked from each housing, particularly the alternative energy generating devices are assembled and disposed in operation remotely from the housings themselves.

The mobile power system as described herein can be advantageously deployed in nearly any location in any climate to provide renewable energy, telecommunications, and remote monitoring to places where such services are lacking. The mobile power system can be used to generate energy and provide power to any application that requires power in the vicinity of the mobile power system. As mentioned above, the mobile power system can be housed in any number and size of housings suitable for the power demands and terrain over which the system must travel to reach the desired location. In an exemplary embodiment, for a system capable of delivering 40 kW of power or more, the mobile power system can be transported in two 20-foot containers. The containers can be carried, for example, on military trailers. The containers can be packed in any manner suitable for rapid deployment of the system. In one embodiment, one container will contain the electronics component room, the false floor with battery array underneath, and a plurality of solar panels. The second container can contain the wind power generation device components, additional optional components, such as diesel generator(s), and the like, and excess solar panels to increase the power generated by the solar power generating device. In an exemplary embodiment, such a mobile power system is capable of delivering at least 40 kW of power.

Moreover, multiple mobile power systems can be used in tandem in a single location when multiple applications require powering, or the power demands of a single application require more power than a single mobile power system is capable of delivering. Such applications can include, without limitation, power equipment and tools, electric vehicles, telecommunications, telemedicine, lighting, and other systems, such as security, and the like. An exemplary application for use with the mobile power system is a water generation system. In one embodiment, a single mobile power system is used to power the water generation system. In another embodiment, the system can comprise two mobile power systems; one to power the water generation system, and a second to provide energy to any other applications utilized at the location. In still another embodiment, In another embodiment, the system can comprise three mobile power systems; one to power the water generation system, a second to power telemedicine needs, and a third to provide energy to any other applications utilized at the location. As used herein, "water generation system" is generally intended to refer to any system configured to generate water from an air stream. Exemplary water generation systems generally comprise an inlet for receiving an air stream, a condensing element located in the air stream, a collector for gathering water vapor condensate that is formed on the condensing element. The water vapor condensate can then be cleaned and filtered by any means commonly known to those having skill in the art to produce potable water. For example, the water vapor condensate can be reverse osmosis membrane filtered, ultraviolet (UV) purified, ozone disinfected, and the like. The water generation system can provide hot or cold water in nearly any climate, including hot and arid climates. In an exemplary embodiment, the water generation system is in electrical communication with the mobile power system and is capable of producing about 1,000 to about 5,000 liters of potable water per day. An exemplary water generation system is the Oasis System commercially available from Air2eau Ltd. An advantage of this system, is it can be housed in one of the 20 foot containers (or an additional container beyond the number needed for the particular mobile power system used) and transported to the intended location with the mobile power system. As such, the mobile hybrid power system can then power the water generation system and represents an endless supply of sustainable potable water from the air via a renewable energy source.

Again, it is understood that this is but one example of an application configured for use with the mobile power system. Any number of applications can be envisioned for use with the renewable energy provided by the mobile power system described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mobile power system, comprising:
   a plurality of energy sources;
   a plurality of electronic and telecommunications components configured to convert power generated by the plurality of energy sources to direct current (DC) power, wherein the plurality of electronic and telecommunications components condition the DC power and direct the conditioned DC power to a Public Switch Telephony Network (PSTN); and
   one or more transportable housings configured to hold the plurality of energy sources and the plurality of electronic and telecommunications components during transport of the one or more housings, wherein at least one of the one or more transportable housings comprises a control room disposed in a rearmost portion of the housing opposite the at least one passageway opening, wherein the control room is configured to house control equipment disposed to control the plurality of energy sources.

2. The mobile power system of claim 1, wherein the one or more transportable housings comprises a first end, a second end opposite the first end, a top wall, a first side wall, a second side wall opposite the first side wall, a bottom wall, and at least one opening disposed in the first end, the second end, the first side wall, the second side wall, the top wall, or a combination comprising at least one of the foregoing.

3. The mobile power system of claim 1, wherein the control room further comprises a cooling unit disposed in an end or wall of the housing at the rearmost portion, wherein the cooling unit is configured to control a temperature and a humidity in the control room.

4. The mobile power system of claim 1, further comprising an agnostic communications terminal in communication with at least one of the plurality of energy sources, the agnostic communications terminal being disposed to communicate monitoring statistics associated with the mobile power system over a plurality of communications mediums.

5. The mobile power system of claim 4, wherein the plurality of communications mediums includes BGAN, KU Band, CDMA, GSM, IDEN, UMTS, LTE, GSMR, UHF, VHF, HF, and military frequency communications.

6. The mobile power system of claim 1, further comprising an agnostic communications terminal in communication with the control equipment, the agnostic communications terminal being disposed to communicate monitoring statistics associated with the mobile power system over a plurality of communications mediums.

7. The mobile power system of claim 6, wherein the plurality of communications mediums includes BGAN, KU Band, CDMA, GSM, IDEN, UMTS, LTE, GSMR, UHF, VHF, HF, and military frequency communications.

8. The mobile power system of claim 1, wherein the one or more transportable housings satisfy International Organization for Standardization container standards, Internal Aircraft/Helicopter Slingable Unit standards, Container Safety Convention standards, Coast Guard Certification standards, Military Specification standards, Mine Resistant Ambush Protected standards, or a combination comprising at least one of the foregoing industrial or military standards.

9. The mobile power system of claim 1, wherein the plurality of energy sources includes at least one of a solar powered generating device, a wind powered generating device, a hydrogen fuel cell powered generating device, and a biodiesel powered generating device.

10. The mobile power system of claim 1, wherein the conditioned DC power is highly conditioned DC power within five percent total harmonic distortion.

11. The mobile power system of claim 1, wherein the conditioned DC power is directed to the PSTN over a forty-eight volt DC bus.

12. The mobile power system of claim 1, wherein the conditioned DC power is directed to the PSTN over a wide bus.

13. The mobile power system of claim 12, wherein the wide bus includes a forty-eight volt DC medium and a twelve volt DC medium.

14. The mobile power system of claim 12, wherein the wide bus includes a range of mediums disposed to provide DC power at a plurality of DC voltages.

15. The mobile power system of claim 14, wherein the range of inediums is a range from about twelve volts DC to forty-eight volts DC.

* * * * *